(12) United States Patent
Grupp et al.

(10) Patent No.: US 10,145,664 B2
(45) Date of Patent: Dec. 4, 2018

(54) COORDINATE MEASURING MACHINE AND METHOD FOR OPERATING A COORDINATE MEASURING MACHINE

(71) Applicant: Carl Zeiss Industrielle Messtechnik GmbH, Oberkochen (DE)

(72) Inventors: Guenter Grupp, Boehmenkirch (DE); Ralf Bernhardt, Aalen (DE); Klaus Bendzulla, Morsbach (DE); Gerd Moser, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 181 days.

(21) Appl. No.: 15/295,905

(22) Filed: Oct. 17, 2016

(65) Prior Publication Data
US 2017/0089684 A1 Mar. 30, 2017

Related U.S. Application Data

(63) Continuation of application No. PCT/EP2015/056146, filed on Mar. 23, 2015.

(30) Foreign Application Priority Data

Apr. 17, 2014 (DE) .................. 10 2014 005 664

(51) Int. Cl.
*G01B 5/00* (2006.01)
*G01B 5/008* (2006.01)
(Continued)

(52) U.S. Cl.
CPC ............. *G01B 5/008* (2013.01); *G01B 21/04* (2013.01); *G05B 19/401* (2013.01); *G05B 2219/37193* (2013.01)

(58) Field of Classification Search
CPC .... G01B 11/005; G01B 5/008; G01B 21/045; G01B 3/008; G01B 21/04; G01B 21/047
(Continued)

(56) References Cited

U.S. PATENT DOCUMENTS 6,158,136 A * 12/2000 Gotz ................... G01B 3/008
33/503
6,457,366 B1 * 10/2002 Hidaka ................ G01B 5/012
73/634

(Continued)

FOREIGN PATENT DOCUMENTS

DE 10 2010 017 903 A1 10/2011
DE 10 2011 089 039 A1 6/2013
(Continued)

OTHER PUBLICATIONS

International Search Report dated May 27, 2015 of international application PCT/EP2015056146 on which this application is based.
(Continued)

*Primary Examiner* — Yaritza Guadalupe-McCall
(74) *Attorney, Agent, or Firm* — Walter Ottesen, P.A.

(57) ABSTRACT

A coordinate measuring machine including a workpiece support for mounting a workpiece to be measured; a mechanism for moving a sensor in a first coordinate direction and a second coordinate direction perpendicular thereto. The mechanism includes: a first measurement slide guided in the first coordinate direction along two parallel guides arranged on opposite sides of the workpiece support. The first measurement slide spans the support. The first slide is driven via a first drive, which drives the first slide along a first guide of the guides, and is driven via a second drive, which drives the first slide along the second of the guides; a second measurement slide guided movably in the second coordinate direction along the first measurement slide. The second slide is assigned a position measuring system, via which the posi-
(Continued)

tion of the second measurement slide relative to the first measurement slide can be determined; a controller, which actuates the first and second drive. The controller includes a force feedforward control, which, depending on the detected position ($x_{actual}$) of the second measurement slide and depending on a setpoint acceleration ($a_{setpoint}$) to be set of the first measurement slide, brings about an actuation of the first drive and/or of the second drive in such a way that the torques which as a result of the acceleration of the first measurement slide by the first drive and by the second drive relative to a rotation axis ($R_z$) which is perpendicular to the first and second coordinate directions at least partly or completely compensate for one another.

22 Claims, 9 Drawing Sheets

(51) Int. Cl.
*G01B 21/04* (2006.01)
*G05B 19/401* (2006.01)

(58) Field of Classification Search
USPC .......................................................... 33/503
See application file for complete search history.

(56) References Cited

U.S. PATENT DOCUMENTS

| | | |
|---|---|---|
| 7,599,813 B2 | 10/2009 | Grupp |
| 7,627,957 B2 | 12/2009 | Uhl et al. |
| 2007/0295100 A1* | 12/2007 | Igasaki ................ G01B 3/008 73/818 |
| 2008/0249737 A1* | 10/2008 | Jordil .................. G01B 3/008 702/152 |
| 2009/0307916 A1* | 12/2009 | McLean ............... G01B 21/04 33/503 |
| 2010/0000307 A1* | 1/2010 | Igasaki ................ G01B 3/008 73/105 |
| 2013/0215433 A1 | 8/2013 | Crampton |
| 2016/0184989 A1* | 6/2016 | Neff ................... B25J 9/1633 700/260 |
| 2017/0089684 A1* | 3/2017 | Grupp .................. G01B 5/008 |

FOREIGN PATENT DOCUMENTS

| | | |
|---|---|---|
| DE | 10 2011 089 061 A1 | 6/2013 |
| DE | 10 2013 210 739 B3 | 6/2014 |
| GB | 2 445 825 A | 7/2008 |

OTHER PUBLICATIONS

English translation and the Office action of the German Patent Office dated Dec. 15, 2014 in German patent application 10 2014 005 664.3 on which the claim of priority is based.

English translation of an International Preliminary Report on Patentability of international application PCT/EP2015/056146 on which this application is based.

\* cited by examiner

COORDINATE MEASURING MACHINE AND METHOD FOR OPERATING A COORDINATE MEASURING MACHINE

CROSS REFERENCE TO RELATED APPLICATIONS

This application is a continuation application of international patent application PCT/EP2015/056146, filed Mar. 23, 2015, designating the United States and claiming priority from German application 10 2014 005 664.3, filed Apr. 17, 2014, and the entire content of both applications is incorporated herein by reference.

FIELD OF THE INVENTION

The invention relates to a coordinate measuring machine including a workpiece support for mounting a workpiece to be measured, a mechanism for moving a sensor in at least one first coordinate direction and a second coordinate direction perpendicular thereto. The mechanism includes for this purpose a first measurement slide, which is guided in the first coordinate direction along two parallel guides arranged on opposite sides of the workpiece support, wherein the first measurement slide spans the workpiece support. The first measurement slide is driven via a first drive, which drives the first measurement slide along a first guide of the guides. Moreover, the first measurement slide is additionally driven via a second drive, which drives the first measurement slide along the second guide of the guides. The mechanism furthermore includes a second measurement slide, which is guided movably in the second coordinate direction along the first measurement slide, wherein the second measurement slide is assigned a position measuring system, via which the position of the second measurement slide relative to the first measurement slide can be determined. The coordinate measuring machine furthermore includes a controller, which actuates at least the first drive and the second drive.

The invention furthermore also relates to a method for operating a coordinate measuring machine constructed in the manner described in the introduction.

BACKGROUND OF THE INVENTION

Such a coordinate measuring machine and a corresponding method for operating such a coordinate measuring machine are known from U.S. Pat. No. 7,599,813. Inter alia, a coordinate measuring machine of the type mentioned in the introduction is disclosed therein. In the case of the coordinate measuring machine shown in association with the embodiments, this is a coordinate measuring machine of the so called gantry type. The latter includes a measurement table as workpiece support for mounting a workpiece to be measured. The sensor used to scan the surface of the workpiece is moved relative to the workpiece to be measured in the three mutually perpendicular coordinate directions (x, z, y) via a gantry mechanism. For this purpose, the mechanism includes a first measurement slide in the form of a gantry, which spans the measurement table and which is guided movably in a first coordinate direction on two parallel guides arranged laterally with respect to the measurement table. The first measurement slide (gantry) is driven via a first drive, which drives the first measurement slide along a first guide of the guides, and is driven via a second drive, which drives the first measurement slide along the second guide of the two guides. Along the cross beam of the first measurement slide, the cross beam spanning the measurement table horizontally, a second measurement slide is guided movably in a second coordinate direction, wherein the second measurement slide is assigned a position measuring system in the form of a scale and an associated scale sensor, via which the position of the second measurement slide relative to the first measurement slide can be determined. Moreover, the coordinate measuring machine includes a controller, by which the first drive and the second drive can be actuated.

In one particularly advantageous embodiment, the first and second drives of the first measurement slide (that is, of the gantry) are actuated by means of a multistage regulating circuit. In this case, the regulating circuit of both drives includes a jointly used position regulator, the output of which is applied to a regulator designated as a synchronous regulator. The synchronous regulator includes two mutually separate speed regulators, wherein the output of the first speed regulator is applied to the input of the first drive regulating circuit and the output of the second speed regulator is applied to the input of the second drive regulating circuit.

The position regulator is a standard position regulator for a movement axis, wherein the position regulator regulates the position of the gantry not along the movement axis of only one drive, but rather along a fictitious drive axis lying in the center between the two movement axes of the two drives for the first measurement slide. For this purpose, the mechanism for measuring the position of the first measurement slide includes two position measuring systems, wherein position measurement values of the first measurement slide relative to the first guide are ascertained via a first of the position measuring systems and position measurement values of the first measurement slide relative to the second guide are ascertained via the second position measuring system. From these aforesaid first position measurement values of the first measurement slide and the second position measurement values of the first measurement slide, an average value is then calculated and fed back as feedback to the position regulator. A reference variable for the position regulator is a setpoint position.

The output of the position regulator is applied as a reference variable to both speed regulators of the synchronous regulator.

In a first variant, the time derivative of the average value is used as a feedback variable of the speed regulators.

In a second variant, a difference speed resulting from the difference value of the measured speed of the first drive and of the second drive is used as a feedback variable of the speed regulators. In this case, firstly the difference speed itself, and also the single time derivative of the difference speed and the double time derivative of the difference speed are fed back to the two speed regulators, wherein the feedback is done with different signs; that is, that at one speed regulator the feedback variable is subtracted from the reference variable and at the other speed regulator the feedback variable is added to the reference variable.

The two speed regulators then yield, as output, speed values for the drive regulating circuit of the first drive and for the drive regulating circuit of the second drive for driving the first measurement slide.

The special feature of the coordinate measuring machine known from the relevant document can be seen in the use of two separate drives via which the first measurement slide is driven in the first coordinate measuring direction. As a result, it is possible purely in principle to compensate for torques which would occur in the case of a drive of the first measurement slide with only one drive on only one side of the first measurement slide. However, the compensation of the torques is possible only very unsatisfactorily with the controller disclosed. This has various causes. Firstly, in the case of a movement of the second measurement slide in the second coordinate direction, the center of gravity of the entire mechanism shifts in the first coordinate direction. This leads to altered mass moments of inertia of the mechanism which are not taken into account in the regulator of the controller in accordance with the documents cited above. Furthermore, the abovementioned regulator can react to resultant torques, resulting from the forces of the first and second drives, only if, on account of the resultant torque, the first measurement slide is already rotating about the rotation axis perpendicular to the first and second coordinate directions.

SUMMARY OF THE INVENTION

It is an object of the invention to provide a coordinate measuring machine of the type mentioned in the introduction and also a corresponding method for operating such a coordinate measuring machine with which such resultant torques of the mechanism about an axis perpendicular to the first coordinate direction and to the second coordinate direction are reliably avoided either partly or even completely.

The object is, for example, achieved by a coordinate measuring machine including a workpiece support configured for mounting a workpiece to be measured; a sensor; a mechanism configured to move the sensor in at least a first coordinate direction (y) and a second coordinate direction (x) perpendicular to the first coordinate direction; the mechanism for moving the sensor including a first guide and a second guide arranged in parallel on opposite sides of the work piece support; a first measurement slide configured to be guided in the first coordinate direction (y) along the parallel first and second guides; the first measurement slide spanning the workpiece support; a first drive configured to drive the first measurement slide along the first guide; a second drive configured to drive the first measurement slide along the second guide; a second measurement slide configured to be guided movably in the second coordinate direction (x) along the first measurement slide; a positioning measuring system assigned to the second measurement slide and configured to determine a position ($x_{actual}$) of the second measurement slide relative to the first measurement slide; a controller configured to actuate at least the first drive and the second drive; and, the controller including a force feedforward control, which, depending on the determined position ($x_{actual}$) of the second measurement slide and depending on a setpoint acceleration ($a_{setpoint}$) to be set of the first measurement slide, is configured to cause an actuation of at least one of the first drive and the second drive in such a way that the torques which occur as a result of the acceleration of the first measurement slide by the first drive and by the second drive relative to a rotation axis ($R_z$) which is perpendicular to the first coordinate direction (y) and the second coordinate direction (x) at least partly or completely compensate for one another.

The special feature of the solution according to the invention in this case can be seen in the fact that the controller includes a force feedforward control, which, depending on the detected position of the second measurement slide and depending on a setpoint acceleration to be set of the first measurement slide, brings about an actuation of the first drive and/or of the second drive in such a way that the torques which as a result of the acceleration of the first measurement slide by the first drive and by the second drive relative to a rotation axis which is perpendicular to the first and second coordinate directions at least partly or even completely compensate for one another.

Such a measure has a series of particular advantages. By providing a force feedforward control, in such a way that the torques which as a result of the acceleration of the first measurement slide by the first drive and by the second drive relative to a rotation axis which is perpendicular to the first and second coordinate directions at least partly or even completely compensate for one another, it can be ensured that torques which would otherwise arise without such a force feedforward control are compensated for or even completely avoided as a result. By including the position of the second measurement slide in the actuation of the first drive and/or of the second drive, it can furthermore be ensured that in the case of the actuation of the first drive and/or of the second drive the actual position of the center of gravity, which position varies in the second coordinate direction depending on the second measurement slide, are concomitantly included in the actuation of the first drive and/or of the second drive. Since the force feedforward control furthermore concomitantly takes account of the setpoint acceleration in the first coordinate direction when ascertaining the actuation of the first drive and/or of the second drive, the force feedforward control can actuate in particular the first drive and/or the second drive proportionally to the acceleration to be set in each case. If the force feedforward control actuates both the first drive and the second drive, this affords the advantage, in particular, that the remaining regulators in the respective regulating circuit only have to contribute very small proportions to the forces to be set by the drives. In the ideal case, a force feedforward control then actuates the first drive and the second drive so well that the remaining regulators are only there to correct small regulation deviations.

Exemplary embodiments can contain the following partial feature:

"wherein the controller comprises a force feedforward control, which, depending on the detected position of the second measurement slide and depending on a setpoint acceleration to be set of the first measurement slide, brings about an actuation of the first drive and/or of the second drive in such a way that the torques which as a result of the acceleration of the first measurement slide by the first drive and by the second drive relative to a rotation axis which is perpendicular to the first and second coordinate directions at least partly or even completely compensate for one another."

It should be expressly pointed out at this juncture that, as an alternative to the partial feature, the following partial feature can also be used if the functional description of the effect of the actuation of the first drive and/or of the second drive by the force feedforward control is not desired:

"wherein the controller comprises a force feedforward control, which, depending on the detected position of the second measurement slide and depending on a setpoint acceleration to be set of the first measurement slide, brings about an actuation of the first drive and/or of the second drive."

With regard to details of some embodiments, the following should be explained here.

The sensor can involve totally different sensors. By way of example, the sensor can be a tactile sensor. In this case, a measuring sensor could then be involved whose probe element is mounted movably in all three coordinate directions and whose deflection in the three coordinate directions is measured by measuring systems. However, a switching probe head could also be involved which yields a sensing signal when its probe element touches the workpiece. Alternatively, however, the sensor can also be an optical sensor. Such an optical sensor could be a digital camera that ascertains the contours of the workpiece on the basis of the camera image. However, a customary optical sensor could also be a triangulation sensor that projects a light pattern onto the workpiece surface and observes the light pattern at a given angle using a digital camera.

In the case of the workpiece support for mounting a workpiece to be measured, this can also involve a wide variety of variants, of course. By way of example, workpiece tables with a planar support or alternatively rotary tables on which the workpiece can be mounted are customary. However, other workpiece mounts on which the workpiece can be mounted could also equally well be provided.

With regard to the first measurement slide, which is guided in the first coordinate direction along two parallel guides arranged on opposite sides of the workpiece support, wherein the first measurement slide spans the workpiece support, different forms of such measurement slides are possible in this case. By way of example, such a measurement slide occurs in so called bridge coordinate measuring machines, in which elevated guides rest on props laterally with respect to the workpiece table, wherein the first measurement slide connects these two guides to one another as a bridge. Likewise, gantry coordinate measuring machines are also known, in which the first measurement slide is embodied in the form of a gantry that spans the workpiece support in a central region. The columns of such gantry-like measurement slides usually rest on two guides fixed to the coordinate measuring machine laterally with respect to the workpiece support. However, mixed forms of the measurement slides described are also equally well possible. By way of example, just one of the two guides may be raised up, while the other guide is arranged in the region of the workpiece support.

The guides can of course involve a wide variety of guides that are very well known from the prior art. So called air bearing guides are often used, in which air bearings slide on a planar surface. However, sliding guides, roller guides or ball rail guides can equally well be involved.

With regard to the drives, too, a wide variety of drive systems are known in this case. By way of example, friction-wheel drives driven by electric motor are often used in this case. Alternatively, however, spindle drives can also be used, for example.

With regard to the position measuring systems, a wide variety of variants are likewise known. By way of example, in the case of a spindle drive the position of a measurement slide can be ascertained from the number of revolutions of the spindle. Likewise, optical distance measurements, for example via interferometers, are also possible. In the majority of cases of present-day coordinate measuring machines, however, scales, in particular incremental scales with assigned reading sensors (for example optical, magnetic, capacitive, et cetera), are used as position measuring systems.

It goes without saying that a wide variety of variants are conceivable as controller as well. By way of example, a controller could be constructed as an analogue regulating circuit. However, in the vast majority of cases of present-day controllers, use will be made of one or more microprocessors in which the regulators are stored as digital software. In particular the force feedforward control, which, depending on the detected position of the second measurement slide and depending on a setpoint acceleration to be set of the first measurement slide, brings about an actuation of the first drive and of the second drive in such a way that the torques which as a result of the acceleration of the first measurement slide by the first drive and by the second drive relative to a rotation axis which is perpendicular to the first and second coordinate directions at least partly or even completely compensate for one another, is also realized in the form of a software module.

In one concrete realization of the force feedforward control unit, the force feedforward control unit ascertains a first force feedforward control value, which is applied to the drive regulating circuit of the first drive, and/or a second force feedforward control value, which is applied to the second drive regulating circuit of the second drive.

In this case, the first force feedforward control value can be a current value which is applied to the current regulator of a first drive regulating circuit, and/or the second force feedforward control value can be a current value which is applied to the current regulator of the second drive regulating circuit. Since the torque and thus the force generated thereby in many electric motors are proportional to the current impressed in the respective electric motor of the drive, the desired force can thereby be set at the respective drive in a simple manner. Of course, however, the first force feedforward control value and the second force feedforward control value need not necessarily be a current value. Rather, of course, any arbitrary other variable can also be involved, such as, for example, a torque to be set of the drive, a force to be set of the drive or a rotational speed to be set of the drive.

The force feedforward control unit can preferably ascertain the first force feedforward control value from the product of the setpoint acceleration and a first proportionality factor and/or ascertain the second force feedforward control value from the product of the setpoint acceleration and a second proportionality factor.

Since the first proportionality factor and/or the second proportionality factor are/is dependent on the respective position of the second measurement slide in the second coordinate direction, the first proportionality factor and/or the second proportionality factor can be ascertained as follows.

The first proportionality factor can be stored in the form of a first fixed value assigned to the first proportionality factor for a first position of the second measurement slide and can be stored in the form of a second fixed value assigned to the first proportionality factor for a second position of the second measurement slide, wherein the first proportionality factor is ascertained using the present position of the second measurement slide by linear interpolation or linear extrapolation from the first fixed value assigned to the first proportionality factor for the first position and the second fixed value assigned to the first proportionality factor for the second position.

The second proportionality factor can be stored in the form of a first fixed value assigned to the second proportionality factor for a first position of the second measurement slide and can be stored in the form of a second fixed value assigned to the second proportionality factor for a second position of the second measurement slide, wherein the second proportionality factor is ascertained using the present position of the second measurement slide by linear interpolation or linear extrapolation from the first fixed value assigned to the second proportionality factor for the first position and the second fixed value assigned to the second proportionality factor for the second position.

In this way, the first proportionality factor and/or the second proportionality factor can be ascertained very simply. In this regard, in an upstream calibration pass, the second measurement slide can firstly be positioned in the second coordinate direction at a first end of the first measurement slide and the first proportionality factor and/or the second proportionality factor can be ascertained for this first position for example by empirical testing and can be stored in the form of first fixed values for this first position of the second measurement slide. The occurrence of torques can be established, for example, by comparing first scale values, representing the position of the first measurement slide in the first coordinate direction along the first guide, with second scale values, representing the position of the first measurement slide in the first coordinate direction along the second guide. Instead of the difference between the first and second scale values of the first measurement slide, however, torques can also be ascertained in a different way. By way of example, a respective acceleration sensor can be fixed to the first measurement slide in the region of the first guide and in the region of the second guide and the respective torque can be ascertained from the difference between the two acceleration sensors.

The second measurement slide is then positioned in the second coordinate direction at the opposite end of the first measurement slide and, in this case, the first proportionality factor and/or the second proportionality factor will be determined empirically again for this position and stored in the form of second fixed values. In order then to ascertain a first proportionality factor and/or a second proportionality factor for an arbitrary position of the second measurement slide in the second coordinate direction which lies between one end and the other end of the first measurement slide, a linear interpolation can simply be applied, as will be explained in greater detail on the basis of the description of the figures.

A corresponding regulator in which the force feedforward control is used is preferably configured as follows: In this case, the first drive regulating circuit of the first drive should be part of a first regulating circuit, which additionally comprises a first position regulator and a first speed regulator, wherein, the reference variable of the first drive regulating circuit either is formed by the sum of the output of the first speed regulator and of the first force feedforward control value or is formed only by the output of the first speed regulator, and the reference variable of the first speed regulator is formed by the output of the first position regulator, and the reference variable of the first position regulator is formed by a setpoint position.

In a first regulating circuit comprising a first position regulator and a first speed regulator, as just described, the reference variable of the second drive regulating circuit can be formed in different ways.

In one particularly preferred embodiment that is extremely stable in particular against oscillations, the reference variable of the second drive regulating circuit is formed exclusively by the second force feedforward control value. This has the particular advantage that the reference variable of the second drive regulating circuit is fixedly predefined by the force feedforward control. Accordingly, alterations of the reference variable cannot occur as a result of the feedback of variables. Therefore, this variant is especially stable against oscillations.

It should expressly be pointed out at this juncture that the expression "second force feedforward control value" does not necessarily mean that besides this there must additionally also be a first force feedforward control value. The term second force feedforward control value was chosen solely in order to delimit the latter terminologically from the first force feedforward control value. As will be shown in association with the embodiment according to FIG. 4 further below but in even more detail, there are also embodiments in which the force feedforward control actuates only one of the two drives, namely the drive designated terminologically by "second drive". In this case, there is then logically consistently only one force feedforward control value, which is designated here by "second force feedforward control value".

Alternatively, the reference variable of the second drive regulating circuit can be formed by the sum of the output of the first speed regulator and of the second force feedforward control value. Such an architecture of the regulator is also functional in principle, but has the disadvantage that such a regulator architecture tends rather toward oscillations since the reference variable is concomitantly formed, inter alia, by the output of the first speed regulator and this first regulator can vary owing to the feedback.

In the case of the last two variants mentioned, in which either the reference variable of the second drive regulating circuit is formed exclusively by the second force feedforward control value, or the reference variable of the second drive regulating circuit is formed by the sum of the output of the first speed regulator and of the second force feedforward control value, the mechanism should comprise at least one further position measuring system, via which a first position measurement value of the first measurement slide relative to the guide is ascertained, and wherein the signal fed back to the first position regulator is the first position measurement value of the first measurement slide and the signal fed back to the first speed regulator is the time derivative of the first position measurement value.

In a fundamentally different architecture of the regulator, the drive regulating circuit of the second drive is part of a second regulating circuit, which additionally comprises a second position regulator and a second speed regulator, wherein the reference variable of the second drive regulating circuit is formed by the sum of the output of the second speed regulator and of the second force feedforward control value, and the reference variable of the second speed regulator is formed by the output of the second position regulator.

In this case, the mechanism should comprise an additional position measuring system, via which a first position measurement value of the first measurement slide relative to the first guide is ascertained, and yet another position measuring system, via which a second position measurement value of the first measurement slide relative to the second guide is ascertained.

In the case of such a regulator configuration in which the second drive is now part of a fundamentally second regulating circuit in which a second position regulator and a second speed regulator are additionally provided, there are basically two expedient possibilities for feeding the first position measurement value and the second position measurement value of the first measurement slide back to the position and speed regulators.

In a first variant, the average value of the first position measurement value and the second position measurement value of the first measurement slide is fed back to the first position regulator, and the time derivative of the average value is fed back to the first speed regulator. As a result, the first position regulator and the first speed regulator do not regulate along the movement axis of the first drive, but rather along a fictitious drive axis which lies in the center between the movement axes of the first drive and the second drive. By contrast, the signal fed back to the second position regulator is the difference value between the first position measurement value and the second position measurement value of the first measurement slide, and the signal fed back to the second speed regulator is the time derivative of the difference value. By means of this measure, therefore, the deviation of the first position measurement value and the second position measurement value can be detected and corrected.

In a second fundamental configuration of a regulator comprising a second position regulator and a second speed regulator, the signal fed back to the first position regulator is the first position measurement value of the first measurement slide, and the signal fed back to the first speed regulator is the time derivative of the position measurement value, whereas the signal fed back to the second position regulator is the second position measurement value of the first measurement slide, and the signal fed back to the first speed regulator is the time derivative of the second position measurement value.

Preferably, the controller of the coordinate measuring machine is embodied in this case such that the resultant torque is less than 10%, in particular less than 5%, of that torque which could be maximally generated by the first drive or the second drive without the respective other drive for a given force.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
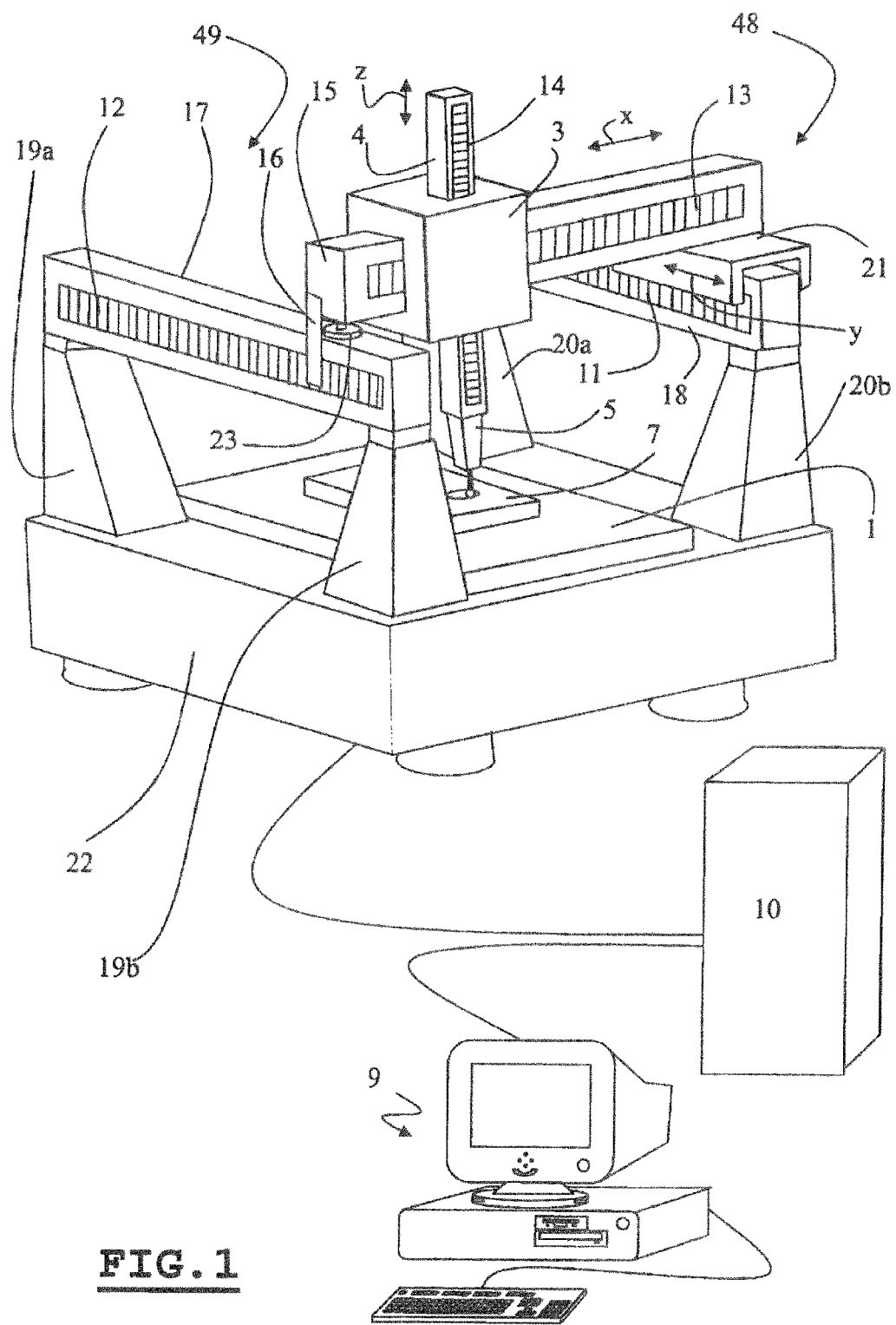
FIG. 1 shows a coordinate measuring machine 48 according to the invention in a bridge configuration.

FIG. 1 shows a first variant of a coordinate measuring machine 48 according to the invention. The coordinate measuring machine includes a base 22 mounted on an underlying factory floor via vibration dampers. In this case, a workpiece support 1 in the form of a measurement table, on which a workpiece 7 to be measured is mounted, is mounted on the base 22. The coordinate measuring machine furthermore includes a mechanism 49, via which a sensor 5, embodied here in the form of a tactile sensor, can be moved in a first coordinate direction, which is designated by the arrow y, and in a second coordinate direction, which is perpendicular to the first coordinate direction y and is designated here by the arrow x, and in a third coordinate direction, which is perpendicular to the first coordinate direction y and to the second coordinate direction x and is designated here by the arrow z. For this purpose, the mechanism 49, as can be seen from FIG. 1, includes the following. It includes a first measurement slide 15, which is configured as a bridge in the present coordinate measuring machine 48. In this case, the first measurement slide 15 is guided in the first coordinate direction y along two parallel guides 17 and 18, wherein the two guides 17 and 18 are arranged on opposite sides of the workpiece support 1 and the first measurement slide 15 thus spans the workpiece support 1. In this case, the first guide 17 is mounted on base 22 via props 19a and 19b, while the second guide 18 is mounted on the base 22 on two further props 20a and 20b. In this case, the first measurement slide 15 is mounted movably via an air bearing 23 on the top side of the first guide 17. For mounting the first measurement slide 15 on the second guide 18, a U-shaped bearing cage 21 is arranged below the first measurement slide 15, a plurality of air bearings (not visible in more specific detail here) being arranged on the bearing cage, the air bearings guiding the first measurement slide 15 along the guide 18. The first measurement slide 15 is driven via a first drive 27 (not visible in more specific detail in FIG. 1), which drives the first measurement slide 15 along the first guide 17 of these two guides 17 and 18, and is driven via a second drive 30 (likewise not visible in more specific detail here), which drives the first measurement slide 15 along the second guide 18 of these guides 17 and 18. The first drive 27 and the second drive 30 in this case are friction-wheel drives, which are not visible for reasons of perspective, wherein in the case of the drive 27 the drive is fixed to the first measurement slide 15 and a friction wheel driven thereby bears against the guide 17, while the second drive 30 is likewise fixed to the first measurement slide 15 and drives a friction wheel that engages on the guide 18. The mechanism 49 additionally includes a position measuring system 12, 16 having a scale 12 and a scale detection sensor 16 via which a first position measurement value $y_{L\text{-}actual}$ of the first measurement slide 15 relative to the first guide 17 is ascertained, and a further position measuring system (11, 33) having a scale 11 and an assigned scale detection sensor 33, via which a second position measurement value $y_{R\text{-}actual}$ of the first measurement slide 15 relative to the second guide 18 is ascertained. In this case, the scale detection sensor 33 is not visible in FIG. 1 for reasons of perspective, but is illustrated in each case in FIGS. 2 and 4 to 7.

The mechanism 49 additionally also comprises a second measurement slide 3, which is often designated as x-slide and which is guided movably in the second coordinate direction x along the first measurement slide 15. The second measurement slide 3 is also assigned a position measuring system (13, 34) including a scale 13 and a scale detection sensor 34 (not visible for reasons of the view), which is fixed to the second measurement slide 3 and can detect the scale values. The position $x_{actual}$ of the second measurement slide 3 relative to the first measurement slide 15 can be determined via the position measuring system (13, 34) assigned to the second measurement slide. In the embodiment provided, the second measurement slide 3 is likewise mounted via a multiplicity of air bearings via which the second measurement slide 3 is supported in relation to the first measurement slide 15. Moreover, a drive is provided in the second measurement slide 3, too, via which drive the second measurement slide 3 can be moved along the measurement slide 1 in the coordinate direction designated by the arrow x. Moreover, the mechanism 49 shown here includes a third measurement slide 4 (often designated as sleeve), to the lower end of which the sensor 5 is fixed. In this case, the third measurement slide 4 can likewise be driven via a friction-wheel drive, which is fixed to the second measurement slide 3 and engages with a friction wheel on the third measurement slide 4, and additionally includes a position detection system including a scale 14 fixed to the third measurement slide 4 and a scale detection sensor fixed to the second measurement slide 3, the scale detection sensor not having its own reference sign. The third measurement slide 4 is likewise mounted movably in the third coordinate direction z via a series of air bearings fixed in the second measurement slide 3.

However, the third measurement slide 4 is not absolutely necessary for moving the sensor 5 relative to the workpiece 7 in the third coordinate direction designated by the arrow z. Alternatively, by way of example, the workpiece support 1 can also be mounted movably in the third coordinate direction designated by the arrow z. In this case, the sensor 5 would be fixed directly to the second measurement slide 3.

The reference sign 10 denotes a controller, which is there for reading out the position values of the position measuring systems (12, 16; 11, 33; 13, 34; 14), for reading out the signals of the sensor 5 and for actuating the first drive 27, the second drive 30 of the first measurement slide 15, and also the drive of the second measurement slide 3 and the drive of the third measurement slide 4. For this purpose, regulators are provided, inter alia, in the controller 10. In this case, the controller 10 usually includes digital regulators in the form of microprocessors having real-time capability which conduct the regulation of the drives of the coordinate measuring machine in accordance with measurement sequence information provided by a measurement computer 9. From the measurement values of the position measuring systems (12, 16; 11, 33; 13, 34; 14) and from the signals of the sensor 5, in the controller captured measurement points of the workpiece 7 are then calculated and communicated to the measurement computer 9 for further evaluation.

Figure 2:
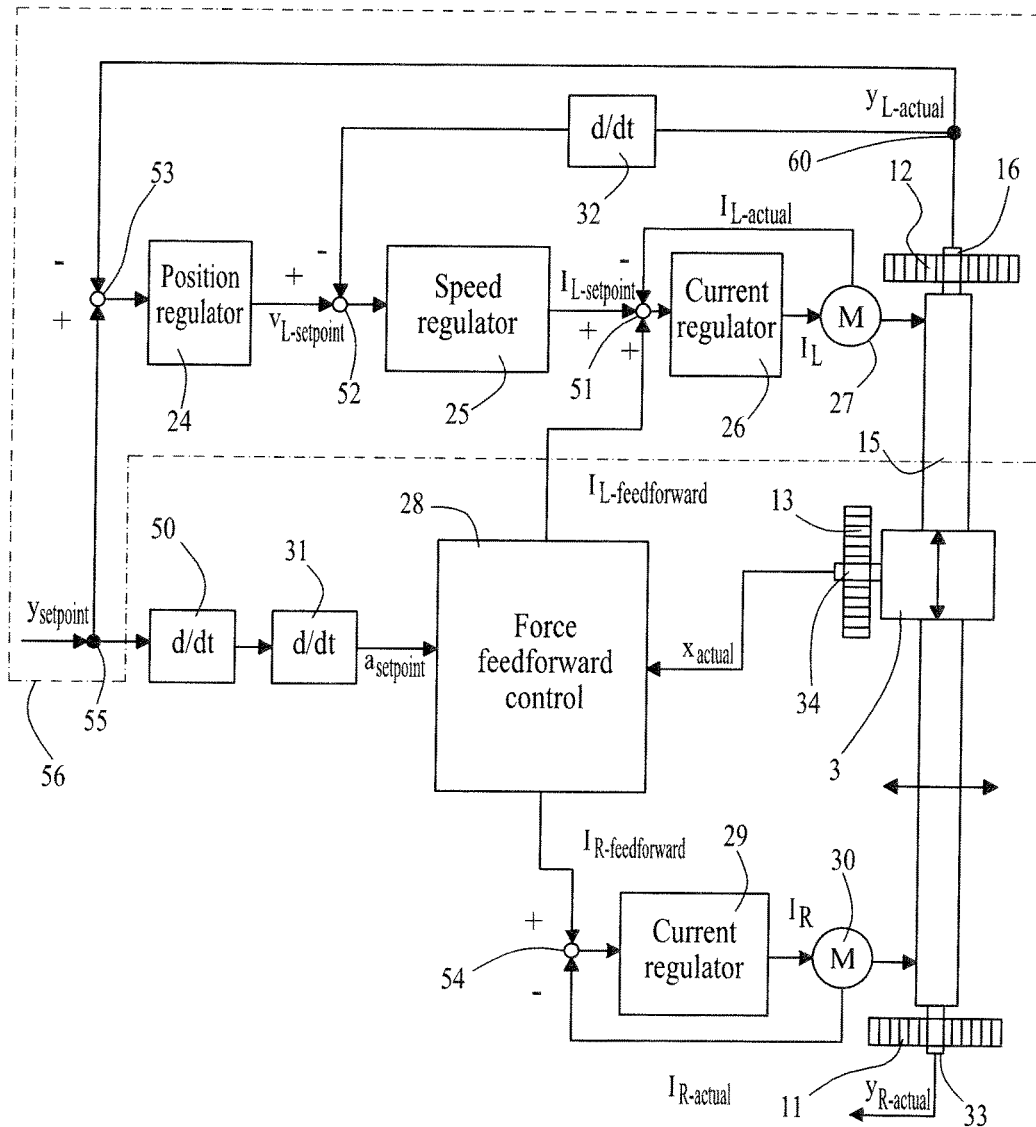
FIG. 2 shows a purely schematic illustration of a regulator in which a first force feedforward control value $I_{L\text{-}feedforward}$ is applied to the first drive regulating circuit (26, 27) and a second force feedforward control value $I_{R\text{-}feedforward}$ is also applied to the second drive regulating circuit (29, 30), wherein the reference variable of the second drive regulating circuit (29, 30) is formed exclusively by the second force feedforward control value $I_{R\text{-}feedforward}$.

The configuration of the controller 10 according to the invention will now be explained in an embodiment in association with FIG. 2. FIG. 2 shows here purely schematically selected components of the regulator contained in the controller 10 from FIG. 1, and components of the mechanism 49 that interact therewith. The relevant components of the mechanism 49 have already been described in association with FIG. 1 and here have the same reference signs as have already been explained in association with FIG. 1. This involves the first measurement slide 15, the second measurement slide 3, the position measuring system (12, 16), via which a first position measurement value $y_{L\text{-}actual}$ is ascertained, the position measuring system 11, 33, via which a second position measurement value of the first measurement slide 15 relative to the second guide 18 is ascertained, the position measuring system (13, 34), via which a position measurement value $x_{actual}$ of the second measurement slide 3 relative to the first measurement slide 15 is ascertained, and also the first drive 27, which drives the first measurement slide 15 along a first guide 17, and the second drive 30, which drives the first measurement slide 15 along the second guide 18. The same reference signs as explained in association with FIG. 1 were used for these components. The regulator via which the first drive 27 and the second drive 30 are driven is constructed here as follows. In this case, the first drive 27 is incorporated into a first drive regulating circuit, which besides the drive 27 additionally includes a current regulator 26, wherein the current regulator 26 applies a current $I_L$ to the drive 27, and wherein the current $I_{L\text{-}actual}$ actually set in the motor of the first drive 27 is fed back to the first current regulator 26. The second drive 30 is incorporated into a second drive regulating circuit in exactly the same way, the second drive regulating circuit additionally including a second current regulator 29 besides the drive 30. In this case, the second current regulator 29 applies a current $I_R$ to the second drive 30, wherein the drive current $I_{R\text{-}actual}$ actually set in the motor of the second drive 30 is fed back to the input of the current regulator 29. In this case, the first drive regulating circuit (26, 27) of the first drive 27 is part of a first regulating circuit, which additionally includes a first position regulator 24 and a first speed regulator 25. The first regulating circuit including the first position regulator 24 and the first speed regulator 25 operates very similarly to the regulating circuit that would be required in the case of the drive of the first measurement slide 15 with just a single drive 27. The regulating circuit will be explained in advance before the force feedforward control 28, the differentiator 31, the differentiator 50 and the second drive regulating circuit 29, 30 are discussed. If the first force feedforward control value $I_{L\text{-}feedforward}$ explained in greater detail further below is disregarded, then the reference variable of the first drive regulating circuit (current regulator 26 and first drive 27) is formed by the output of the first speed regulator 25, namely by the signal $I_{L\text{-}setpoint}$, and the reference variable of the first speed regulator 25 is formed by the output of the first position regulator 24, namely by the signal $v_{L\text{-}setpoint}$. The reference variable of the first position regulator 24 in turn is formed by a setpoint position $y_{setpoint}$. As can be seen from the summation point 53, the signal fed back to the first position regulator 24 is the first position measurement value $y_{L\text{-}actual}$ actual of the measurement slide 15, which is detected by the position measuring system (scale 12, scale detection sensor 16). As can furthermore be seen from the summation point 52 of the speed regulator 25, the signal fed back to the speed regulator 25 is the time derivative of the first position measurement value $y_{L\text{-}actual}$. In this case, the time derivative of the first position measurement value $y_{L\text{-}actual}$ is ascertained by the differentiator 32.

At this juncture a few observations shall briefly be stated with regard to the summation points 51 to 54, 57 and 58 and with regard to the branching points 55, 60 to 70 that are used in association with FIGS. 2 to 7. The summation points 51 to 54, 57 and 58 symbolically indicate a summation and/or subtraction of different signals, wherein a sign + or − is appended to each of the signals present at the respective summation point. At the summation point 51 in FIG. 2, for example, the signals $I_{L\text{-}setpoint}$ and $I_{L\text{-}feedforward}$ are summed owing to the sign + and the signal $I_{L\text{-}actual}$ is subtracted therefrom owing to the sign −. The regulation deviation resulting therefrom is present at the first current regulator 26. By contrast, the branching points 55, 60 to 70 show a branching of one and the same signal into different signal paths.

The regulator just described, which is demarcated from the rest of the components by the dashed line bearing the reference sign 56 only for reasons of affording a better understanding, would be suitable in principle for driving the first measurement slide 15 with just one drive 27. In the manner according to the invention, however, this regulation additionally now includes a force feedforward control 28, which brings about an actuation of the first drive 27 and of the second drive 30 in such a way that the torques which as a result of the acceleration of the first measurement slide 15 by the first drive 27 and by the second drive 30 relative to a rotation axis $R_z$, that is perpendicular to the first coordinate direction y and the second coordinate direction x at least partly or even completely compensate for one another.

Figure 9:
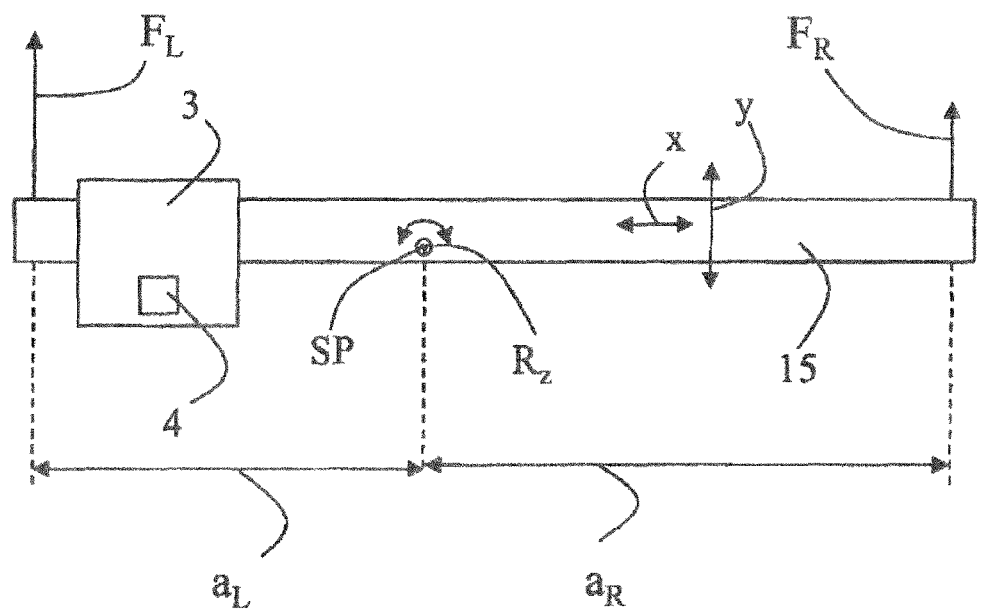

The last-mentioned substantive matter will be illustrated briefly again with reference to FIG. 9. In this case, FIG. 9 shows a purely schematic illustration of the first measurement slide 15, the second measurement slide 3 and the third measurement slide 4 from FIG. 1 for the elucidation of a torque which as a result of the first drive 27 and the second drive 30 relative to a rotation axis $R_z$, that could arise perpendicular to the first coordinate direction y and the second coordinate direction x. As is evident from FIG. 9, the second measurement slide 3 is situated in the second coordinate direction x almost completely at the end of the first measurement slide 15, that is, on the far left here in the illustration. In the x-y plane this results in a position of the center of gravity SP that lies somewhat to the left of half of the first measurement slide 15. If, upon an acceleration of the first measurement slide 15 in the first coordinate direction y, the first drive 27 generates a first force $F_L$ and the second drive 30 generates a second force $F_R$, then a first torque $M_L = F_L \times a_L$ and a second torque $M_R = F_R \times a_R$ result at the center of gravity SP. In this case, the reference sign $a_L$ denotes the lever arm between the center of gravity SP and the point of engagement of the force $F_L$. The reference sign $a_R$ denotes the lever arm between the center of gravity SP and the point of engagement of the force $F_R$. If the resultant torque $M_{Res} = M_L + M_R$, that is, the sum of the first torque $M_L$ and of the second torque $M_R$, is not equal to zero, then the first measurement slide 15 rotates about a rotation axis $R_z$, which is situated at the center of gravity SP and which is perpendicular to the first coordinate direction y and the second coordinate direction x.

It should be expressly mentioned at this juncture that the rotation axis $R_z$ was placed exactly at the center of gravity SP of the first measurement slide 15 and of the components (second measurement slide 3, third measurement slide 4 and sensor 5) situated thereon only for reasons of clarity of illustration. The rotation axis $R_z$ could for example equally well be placed toward the left or toward the right of the center of gravity SP in the second coordinate direction x. In this case, however, the torque arising as a result of the acceleration of the center of gravity SP relative to the respective rotation axis would then additionally have to be concomitantly taken into account as well.

Returning to the regulator in accordance with FIG. 2, therefore, the force feedforward control 28 ensures in other words that the first drive 27 generates a first force $F_L$ and the second drive 30 generates a second force $F_R$ in a manner such that the resultant torque $M_{Res}$ turns toward zero in the ideal case and the acceleration of the first measurement slide 15 in the first coordinate direction y produces a pure translation.

In order to bring about the actuation of the first drive 27 and of the second drive 30 in this way, the force feedforward control 28 is provided, which ascertains a first force feedforward control value $I_{L\text{-}feedforward}$, which is applied to the first drive regulating circuit (current regulator 26, drive 27) of the first drive 27, and ascertains a second force feedforward control value $I_{R\text{-}feedforward}$, which is applied to the second drive regulating circuit (current regulator 29, drive 30) of the second drive 30. In this case, the first force feedforward control value $I_{L\text{-}feedforward}$ is applied to the summation point 51 of the first current regulator 26, such that the reference variable of the first drive regulating circuit (current regulator 26, drive 27) is not formed solely by the output $I_{L\text{-}setpoint}$ of the first speed regulator 25, but rather by the sum of the output $I_{L\text{-}setpoint}$ of the first speed regulator 25 and of the first force feedforward control value $I_{L\text{-}feedforward}$. By contrast, the reference variable of the second drive regulating circuit (current regulator 29, drive 30) is formed exclusively by the second force feedforward control value $I_{R\text{-}feedforward}$. Thus, the first force feedforward control value $I_{L\text{-}feedforward}$ ascertained by the force feedforward control 28 is applied to the first drive regulating circuit (current regulator 26, drive 27) of the first drive 27, and the second force feedforward control value $I_{R\text{-}feedforward}$ ascertained by the force feedforward control 28 is applied to the second drive regulating circuit (current regulator 29, drive 30) of the second drive 30. In this respect, the first force feedforward control value $I_{L\text{-}feedforward}$ is a current value which is applied to the current regulator 26 of the first drive regulating circuit (current regulator 26, drive 27). In the same way, the second force feedforward control value $I_{R\text{-}feedforward}$ is also a current value which is applied to the current regulator 29 of the second drive regulating circuit (current regulator 29, drive 30). The first force feedforward control value $I_{L\text{-}feedforward}$ thus defines the current value to be impressed into the first drive 27 by the first current regulator 26, and the second force feedforward control value $I_{R\text{-}feedforward}$ defines the current value to be impressed into the second drive 30 by the second current regulator 29, wherein these current values are proportional to the force which is intended to be generated by the drives 27 and 30 in accordance with the respective current values. The first force feedforward control value $I_{L\text{-}feedforward}$ and also the second force feedforward control value $I_{R\text{-}feedforward}$ are dependent on two factors. Firstly, these values are dependent on the absolute value of the setpoint acceleration $a_{setpoint}$ with which the first measurement slide 15 together with the components (second measurement slide 3, third measurement slide 4 and sensor 5) carried thereby are intended to be accelerated in the first coordinate measuring direction y. Secondly, these values are dependent on the center of gravity SP of the measurement slide 15 and of the components (second measurement slide 3, third measurement slide 4 and sensor 5) carried thereby in the second coordinate direction x. The exact position of the center of gravity SP is not necessary, however, for ascertaining the first force feedforward control value $I_{L\text{-}feedforward}$ and the second force feedforward control value $I_{R\text{-}feedforward}$. Since the center of gravity SP moves linearly with the position $x_{actual}$ of the second measurement slide 3 in the second coordinate direction x, ascertaining the present position $x_{actual}$ of the second measurement slide 3 in the second coordinate direction x suffices for ascertaining the first force feedforward control value $I_{L\text{-}feedforward}$ and the second force feedforward control value $I_{R\text{-}feedforward}$.

In this case, the setpoint acceleration $a_{setpoint}$ is ascertained from the setpoint position $y_{setpoint}$ by double differentiation with respect to time via the two differentiators 50 and 31. The present position $x_{actual}$ of the second measurement slide 3 relative to the first measurement slide 15 is determined, as already mentioned above, via a position measuring system (scale 13 and scale detection sensor 34).

Figure 3:
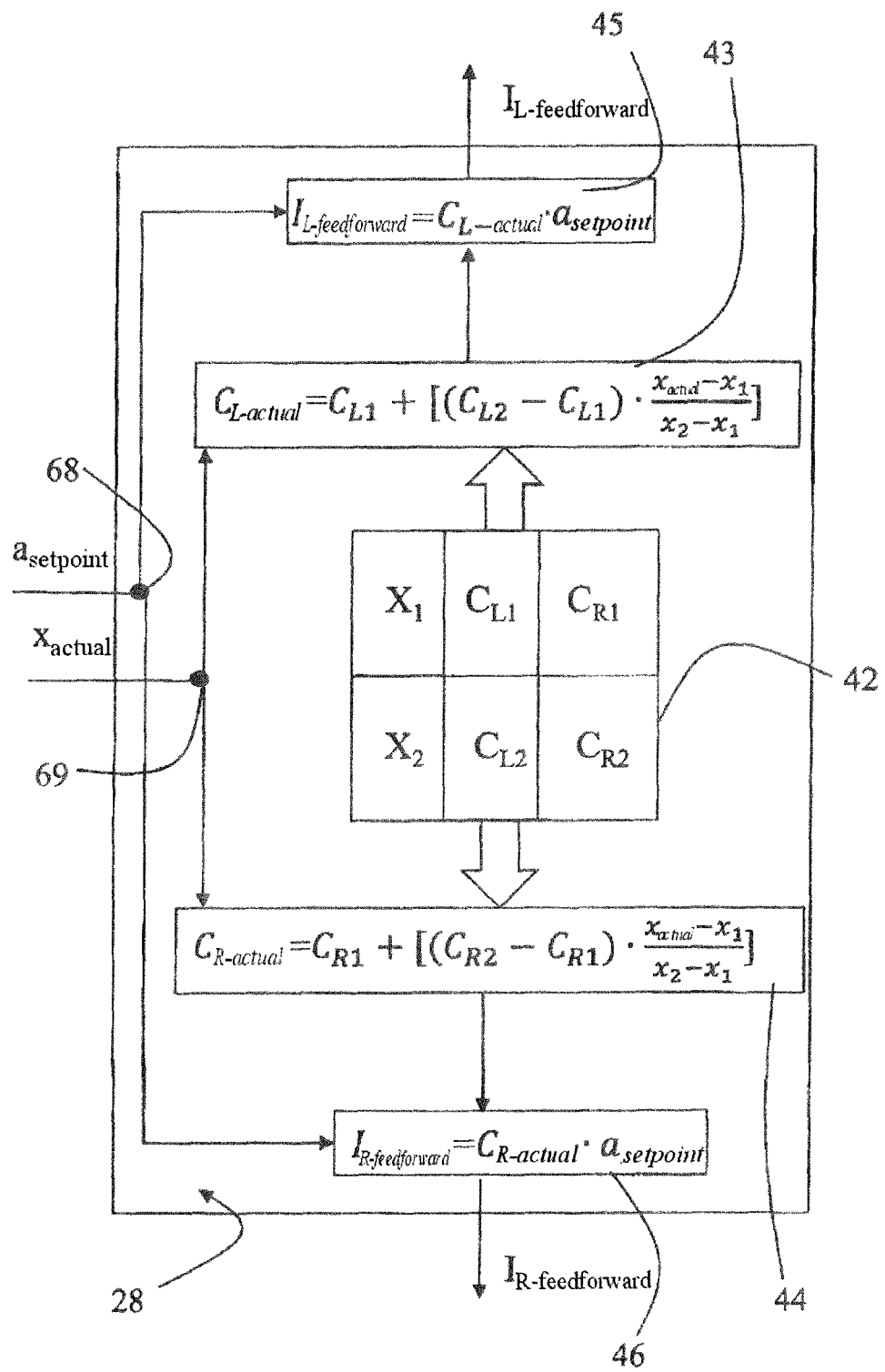
FIG. 3 shows a purely schematic illustration of the force feedforward control 28 from FIG. 2.

In this case, FIG. 3 shows a purely schematic basic illustration of the force feedforward control 28 from FIG. 2, in which the first force feedforward control value $I_{L\text{-}feedforward}$ and the second force feedforward control value $I_{R\text{-}feedforward}$ are ascertained depending on the detected position $x_{actual}$ of the second measurement slide 3 and depending on a setpoint acceleration $a_{setpoint}$ to be set of the first measurement slide 15. As can be seen on the basis of the function group 45, the first force feedforward control value $I_{L\text{-}feedforward}$ is ascertained from the product of the setpoint acceleration $a_{setpoint}$ and a first proportionality factor $C_{L\text{-}actual}$ according to the following equation:

$$I_{L\text{-}feedforward} = C_{L\text{-}actual} \cdot a_{setpoint} \qquad \text{Equation 1:}$$

The first proportionality factor $C_{L\text{-}actual}$ results from an interpolation specification represented by the function unit 43 in FIG. 3 according to the following function:

$$C_{L\text{-}actual} = C_{L1} + \left[(C_{L2} - C_{L1}) \cdot \frac{x_{actual} - x_1}{x_2 - x_1}\right] \qquad \text{Equation 2}$$

The values herein have the following meanings:
$x_{actual}$: Detected position of the second measurement slide 3 in the second coordinate direction x
$x_1$: A first position of the second measurement slide 3 at a first end of the first measurement slide 15 in the second coordinate direction x
$C_{L1}$: A first proportionality factor for the first position $x_1$ of the second measurement slide 3 as a fixed value
$x_2$: A second position of the second measurement slide 3 at the opposite end of the first measurement slide 15 relative to the position $x_1$ in the second coordinate direction designated by the arrow x
$C_{L2}$: A first proportionality factor for the second position $x_2$ of the second measurement slide 3 as a fixed value The values $x_1$, $C_{L1}$, $x_2$ and $C_{L2}$ are taken from a table 42 in which the relevant values are stored.

As is evident from the function group 46, the second force feedforward control value $I_{R\text{-}feedforward}$ is ascertained from the product of the setpoint acceleration $a_{setpoint}$ and a second proportionality factor $C_{R\text{-}actual}$. The following function is used here:

$$I_{R\text{-}feedforward} = C_{R\text{-}actual} \cdot a_{setpoint} \qquad \text{Equation 3:}$$

The second proportionality factor $C_{R\text{-}actual}$ is, as set out by the function group 44, likewise ascertained by a linear interpolation via a following equation:

$$C_{R\text{-}actual} = C_{R1} + \left[(C_{R2} - C_{R1}) \cdot \frac{x_{actual} - x_1}{x_2 - x_1}\right] \qquad \text{Equation 4}$$

The values herein have the following meanings:
$x_{actual}$: Detected position of the second measurement slide 3 in the second coordinate direction x
$x_1$: A first position of the second measurement slide 3 at a first end of the first measurement slide 15 in the second coordinate direction x
$C_{R1}$: A second proportionality factor for the first position $x_1$ of the second measurement slide 3 as a fixed value
$x_2$: A second position of the second measurement slide 3 at the opposite end of the first measurement slide 15 relative to the position $x_1$
$C_{R2}$: Second proportionality factor for the second position $x_2$ of the second measurement slide 3 as a fixed value The values $x_1$, $C_{R1}$, $x_2$ and $C_{R2}$ are likewise stored in the table having the reference sign 42.

Thus, the first proportionality factor $C_{L\text{-}actual}$ is therefore stored in the form of a first fixed value $C_{L1}$ assigned to the first proportionality factor $C_{L\text{-}actual}$ for a first position $x_1$ of the second measurement slide 3 and is stored in the form of a second fixed value $C_{L2}$ assigned to the first proportionality factor $C_{L\text{-}actual}$ for a second position $x_2$ of the second measurement slide. The first proportionality factor $C_{L\text{-}actual}$ suitable for the present position $x_{actual}$ of the second measurement slide 3 is then ascertained using the present position $x_{actual}$ of the second measurement slide 3 by linear interpolation or linear extrapolation from the first fixed value $C_{L1}$ assigned to the first proportionality factor and the second fixed value $C_{R2}$ assigned to the first proportionality factor.

Moreover, the second proportionality factor $C_{R\text{-}actual}$ is stored in the form of a first fixed value $C_{R1}$ assigned to the second proportionality factor $C_{R\text{-}actual}$ for a first position $x_1$ of the second measurement slide 3 and is stored in the form of a second fixed value $C_{R2}$ assigned to the second proportionality factor $C_{R\text{-}actual}$ for a second position $x_2$ of the second measurement slide 3. The second proportionality factor $C_{R\text{-}actual}$ suitable for the present position $x_{actual}$ of the second measurement slide 3 is then ascertained using the present position of the second measurement slide $x_{actual}$ by linear interpolation or linear extrapolation from the first fixed value $C_{R1}$ assigned to the second proportionality factor $C_{R\text{-}actual}$ and the second fixed value $C_{R2}$ assigned to the second proportionality factor $C_{R\text{-}actual}$.

The values $x_1$, $C_{L1}$, $C_{R1}$, $x_2$, $C_{L2}$ and $C_{R2}$ can be ascertained empirically in a calibration method in a simple manner and be stored in the table 42. The empirical ascertainment here proceeds as follows. Firstly, the second measurement slide 3 is positioned in the second coordinate direction x at a first end of the first measurement slide 15 and the position $x_1$ is ascertained for this purpose. Moreover, in the function group 45 and the function group 46 instead of a calculated first proportionality factor $C_{L\text{-}actual}$ and a calculated second proportionality factor $C_{R\text{-}actual}$ different values are used and these values are varied until the torques which as a result of the acceleration of the first measurement slide 15 by the first drive 27 and by the second drive 30 relative to the relevant rotation axis $R_z$, that is perpendicular to the first and second coordinate directions, substantially completely compensate for one another.

The occurrence of torques is ascertained by comparing the first scale value $y_{L\text{-}actual}$, representing the position of the first measurement slide 15 in the first coordinate direction y along the first guide 17, with a second scale value $y_{R\text{-}actual}$, representing the position of the first measurement slide 15 in the first coordinate direction y along the second guide 18.

The measured position $x_1$ and the first proportionality factor $C_{L\text{-}actual}$ and the second proportionality factor $C_{R\text{-}actual}$ are stored as values $x_1$, $C_{L1}$ and $C_{R1}$ in the table 42. The second measurement slide 3 is then moved exactly to the opposite end of the first measurement slide 15 in the second coordinate direction x and here the position $x_2$ of the second measurement slide 3 is ascertained and a first proportionality factor $C_{L2}$ and a second proportionality factor $C_{R2}$ are also ascertained for the second position $x_2$ in the manner described above. These values are then likewise stored as values $x_2$, $C_{L2}$ and $C_{R2}$ in the table 42.

It goes without saying that the ascertainment of the first proportionality factor $C_{L\text{-}actual}$ and of the second proportionality factor $C_{R\text{-}actual}$ for the first slide position $x_1$ and for the second slide position $x_2$ can alternatively also be ascertained via a physical computation model. By way of example, from the configuration data for the position $x_1$ and the position $x_2$ it is possible to ascertain the respective center of gravity in the second coordinate direction x, and therefrom in turn the ratio of the forces which have to be applied by the first drive 27 and the second drive 30 in order to be able to move the first measurement slide 15 in a manner free of torque for the given center of gravity. Via the characteristic curves of the electric motors of the drives 27 and 30, the first proportionality constant $C_{L\text{-}actual}$ and the second proportionality constant $C_{R\text{-}actual}$ can then be ascertained for the relevant positions.

Figure 4:
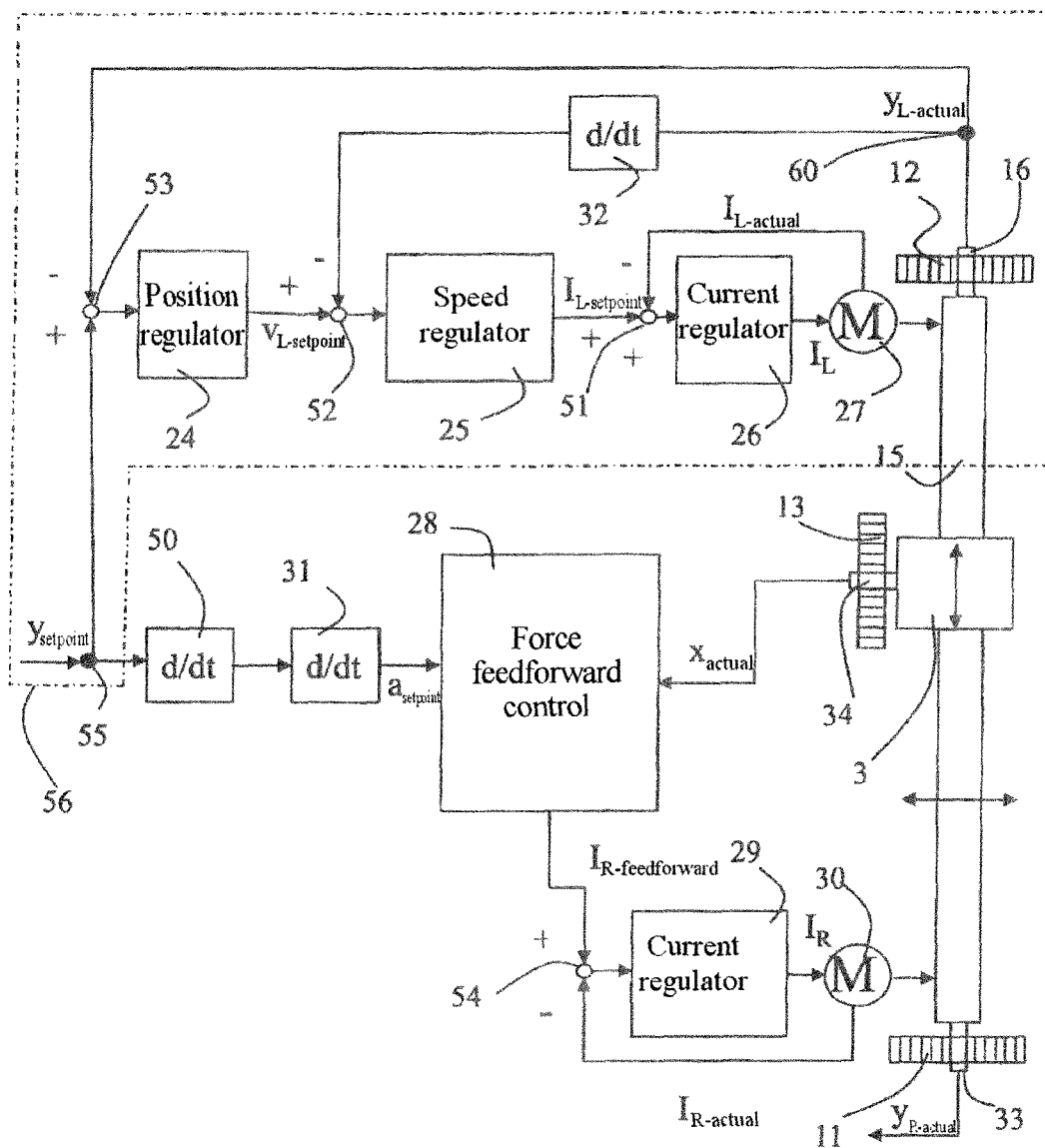
FIG. 4 shows a purely schematic illustration of a regulator in which no force feedforward control value at all is applied to the first drive regulating circuit (26, 27) and a force feedforward control value $I_{R\text{-}feedforward}$ is applied only to the second drive regulating circuit (29, 30)

FIG. 4 shows a purely schematic illustration in accordance with a second embodiment of a regulator which can actuate the first drive 27 and the second drive 30 of the coordinate measuring machine in the manner according to the invention. Virtually the same components as in the embodiment of a regulator in accordance with FIG. 2 are shown therein. In this respect, identical components are allocated identical reference signs. The sole difference between the regulator in accordance with FIG. 4 and the regulator in accordance with FIG. 2 can be seen here in the fact that, unlike in FIG. 2, the force feedforward control 28 applies only one force feedforward control value $I_{R\text{-}feedforward}$ to the second drive regulating circuit (current regulator 29, drive 30). In this embodiment, the reference variable of the first drive regulating circuit (current regulator 26, drive 27) is formed just solely by the output of the first speed regulator 25. In this case, therefore, the force to be set by the first drive 27 is thus no longer predefined by the first force feedforward control value $I_{L\text{-}feedforward}$ as an essential portion of the reference variable of the first drive regulating circuit (26, 27), but rather has to be formed completely by the first speed regulator 25.

Even if, with this embodiment shown in FIG. 4, the torques which as a result of the acceleration of the first measurement slide 15 by the first drive 27 and by the second drive 30 relative to a rotation axis $R_z$ that is perpendicular to the first and second coordinate directions cannot compensate for one another quite as well as is the case with the embodiment in accordance with FIG. 2, this regulator is nevertheless suitable for reducing the torques relatively well. The reason for this is that the force feedforward control value $I_{R\text{-}feedforward}$ is still determined depending on the detected position $x_{actual}$ of the second measurement slide 3 and depending on a setpoint acceleration $a_{setpoint}$ to be set. Specifically, it can be assumed that the first position regulator 24 and the first speed regulator 25 for a specific setpoint acceleration $a_{setpoint}$ always supply approximately the same reference variable $I_{L\text{-}setpoint}$ to the first drive regulating circuit (26, 27). The reason for this is that the setpoint acceleration $a_{setpoint}$ is implicitly defined by the setpoint position $y_{setpoint}$, wherein the setpoint position $y_{setpoint}$ is after all used as a reference variable of the first position regulator 24.

With this premise the force feedforward control 28 can ascertain an assigned force feedforward control value $I_{R\text{-}feedforward}$ depending on the detected position $x_{actual}$ of the second measurement slide 3 and depending on a setpoint acceleration $a_{setpoint}$ to be set of the first measurement slide 15 and apply it to the second drive regulating circuit (29, 30).

In this case, the determination of the force feedforward control value $I_{R\text{-}feedforward}$ proceeds in exactly the same way as was explained for the second force feedforward control value $I_{R\text{-}feedforward}$ in association with the description of the force feedforward control 28 in FIG. 3. The determination of the two proportionality factors $C_{R1}$ and $C_{R2}$ also proceeds in exactly the same way as was explained above in association with FIG. 3.

Incidentally, the regulator in accordance with FIG. 2 could, of course, also be operated exactly such that it works like the regulator in accordance with FIG. 4. For this purpose, it would simply be necessary merely to predefine the value zero in each case for the first fixed value $C_{L1}$ assigned to the first proportionality factor $C_{L\text{-}actual}$ and for the second fixed value $C_{L2}$ assigned to the first proportionality factor $C_{L\text{-}actual}$. Specifically, according to equation 2, the value 0 then results for the first proportionality factor $C_{L\text{-}actual}$ and the value 0 thus likewise results for the first force feedforward control value $I_{L\text{-}actual}$. The effect of this is that the first force feedforward control value $I_{L\text{-}actual}$ thus no longer makes a contribution to the reference variable of the first drive regulating circuit, which then corresponds exactly to FIG. 4.

Therefore, the controller shown in FIG. 4 thus includes a force feedforward control 28 which, depending on the detected position $x_{actual}$ of the second measurement slide 3 and depending on a setpoint acceleration $a_{setpoint}$ to be set of the first measurement slide 15, brings about an actuation only of the second drive 30 in such a way that the torques which as a result of the acceleration of the first measurement slide 15 by the first drive 27 and by the second drive 30 relative to a rotation axis Rz that is perpendicular to the first and second coordinate directions compensate for one another at least partly or even completely.

In the present case, the sole force feedforward control value $I_{R\text{-}feedforward}$ is a current value which is applied to the current regulator 29 of the second drive regulating circuit 29, 30. The force feedforward control unit 28 ascertains the force feedforward control value $I_{R\text{-}feedforward}$ from the product of the setpoint acceleration $a_{setpoint}$ and a proportionality factor $C_{R\text{-}actual}$. In this case, the proportionality factor $C_{R\text{-}actual}$ is stored in the form of a first fixed value $C_{R1}$ assigned to the proportionality factor for a first position $x_1$ of the second measurement slide 3 and is stored in the form of a second fixed value $C_{R2}$ assigned to the proportionality factor $C_{R\text{-}actual}$ for a second position $x_2$ of the second measurement slide 3, wherein the proportionality factor $C_{R\text{-}actual}$ is ascertained using the present position $x_{actual}$ of the second measurement slide 3 by linear interpolation or linear extrapolation from the first fixed value $C_{R1}$ assigned to the proportionality factor $C_{R\text{-}actual}$ and the second fixed value $C_{R2}$ assigned to the proportionality factor $C_{R\text{-}actual}$.

Figure 5:
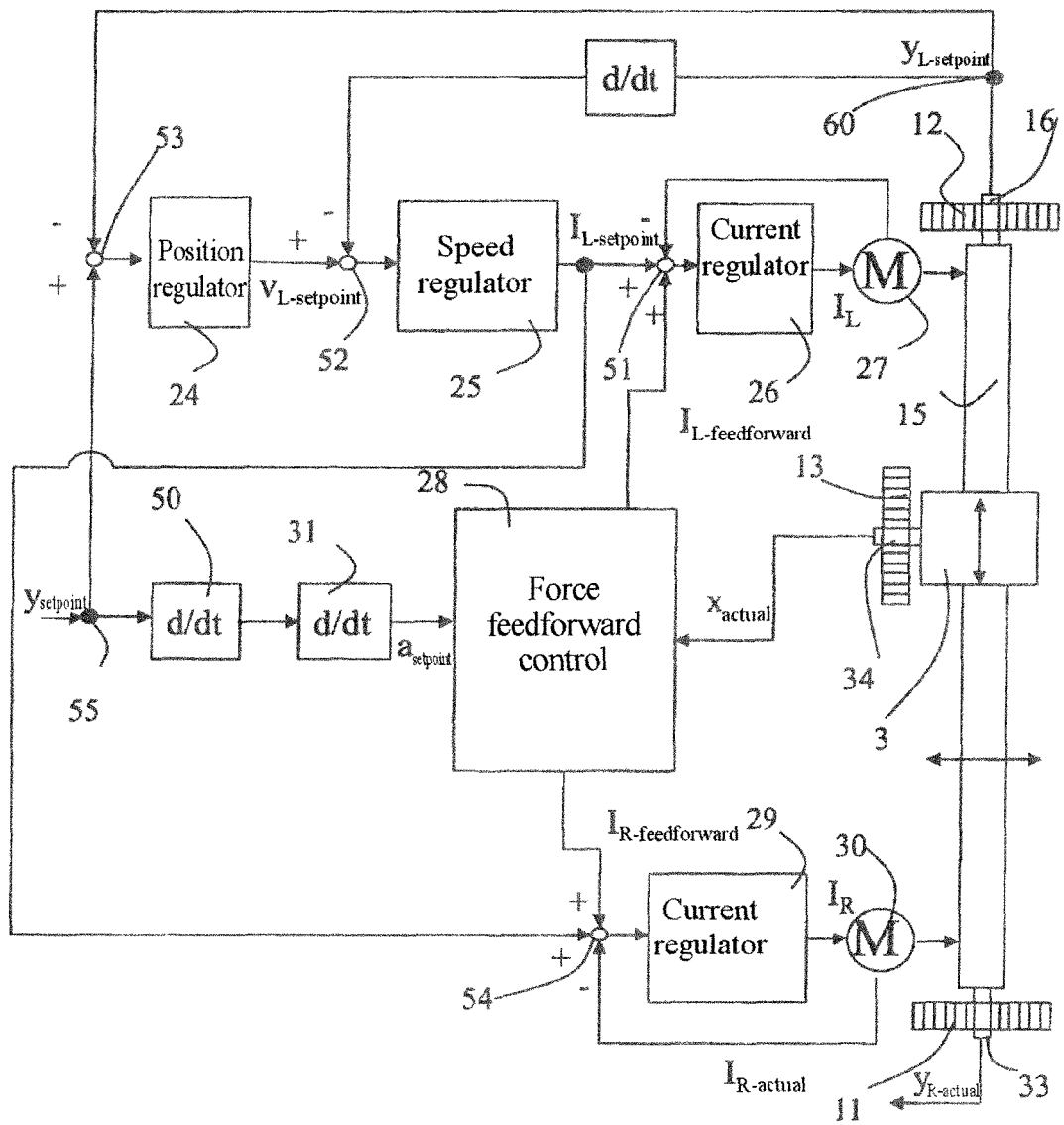
FIG. 5 shows a purely schematic illustration of a regulator in which the reference variable of the second drive regulating circuit (29, 30) is formed by the sum of the output $I_{L\text{-}setpoint}$ of the first speed regulator 25 and of the second force feedforward control value $I_{R\text{-}feedforward}$.

FIG. 5 shows a purely schematic illustration in accordance with a third embodiment of a regulator which can actuate the first drive 27 and the second drive 30 of the coordinate measuring machine in the manner according to the invention. Virtually the same components as in the embodiment of a regulator in accordance with FIG. 2 are shown therein. In this respect, identical components are allocated identical reference signs. The sole difference between the regulator in accordance with FIG. 5 and the regulator from FIG. 2 can be seen here in the fact that the output $I_{L\text{-}setpoint}$ of the first speed regulator 25 is additionally also applied as a reference variable to the summation point 54 of the current regulator 29 of the second drive regulating circuit (current regulator 29, drive 30). In this respect, in the case of this regulating circuit the reference variable of the second drive regulating circuit (current regulator 29, drive 30) is formed by the sum of the output $I_{L\text{-}setpoint}$ of the first speed regulator 25 and of the second force feedforward control value $I_{R\text{-}feedforward}$. The relevant regulator has good functionality in this regard. As already described in detail in the introductory part of the description, this regulator, in contrast to the regulator in accordance with FIG. 2, owing to the output $I_{L\text{-}setpoint}$ of the first speed regulator 25 being applied as a reference variable for the second drive regulating circuit (current regulator 29, drive 30) tends however toward the first measurement slide 15 being excited to effect oscillations.

Figure 6:
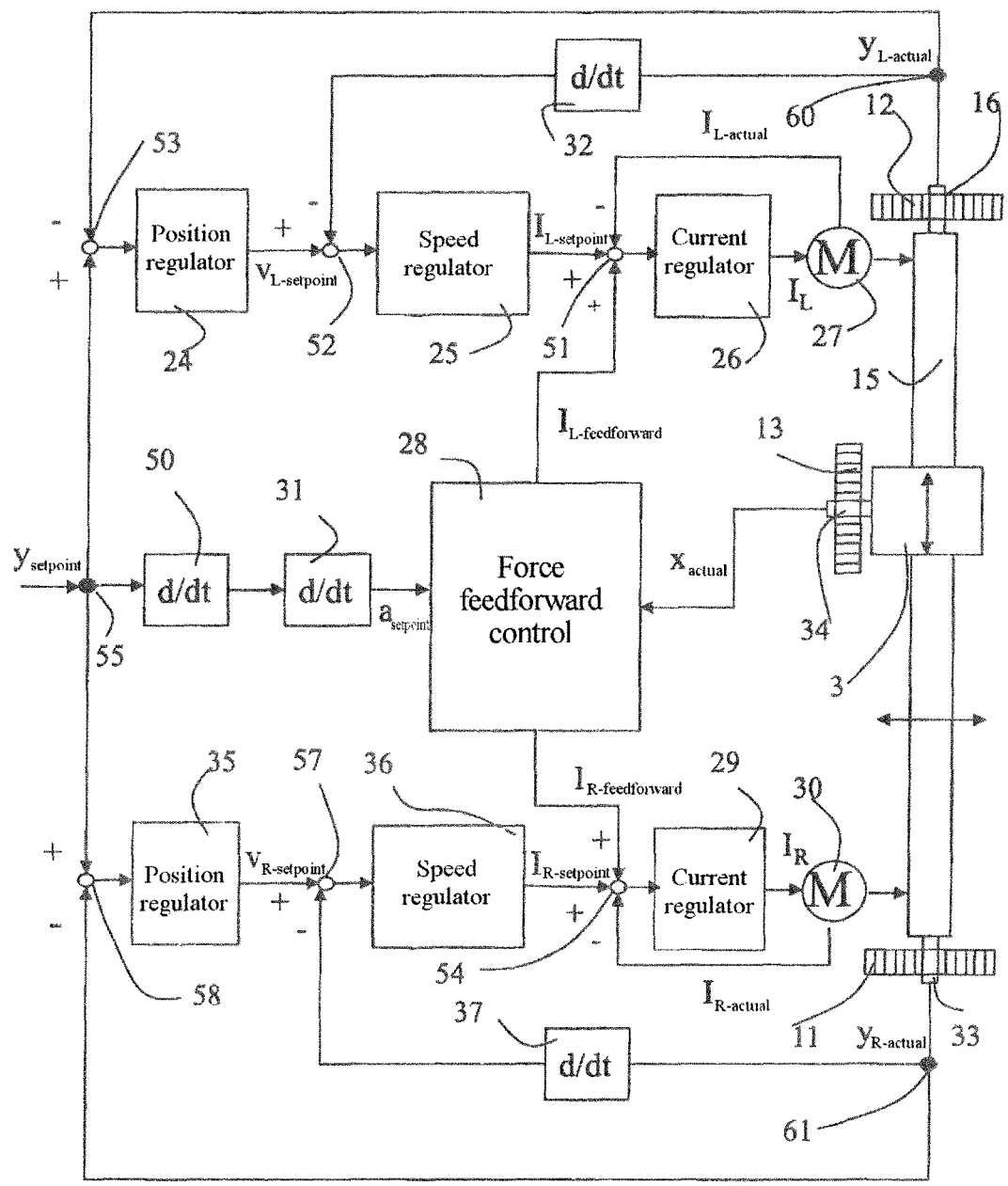
FIG. 6 shows a purely schematic illustration of a regulator comprising a second position regulator 35 and a second speed regulator 36, in which a first position measurement value $y_{L\text{-}actual}$ is fed back to the first position regulator 24 and its time derivative is fed back to the first speed regulator 25 and in which a second position measurement value $y_{R\text{-}actual}$ is fed back to the second position regulator 35 and its time derivative is fed back to the second speed regulator 36.

FIG. 6 shows a fundamentally fourth variant of a regulation of the drives 27 and 30 of the first measurement slide 15. In this case, the regulating circuit in accordance with FIG. 6 constitutes an extension of the regulating circuit in accordance with FIG. 2. In this case, components identical to those in FIG. 2 bear the same reference signs as in FIG. 2. In comparison with the embodiment in accordance with FIG. 2, the regulator in accordance with FIG. 6 is supplemented by the second drive regulating circuit (current regulator 29, drive 30) of the second drive 30 being part of a second regulating circuit, which additionally includes a second position regulator 35 and a second speed regulator 36. As can be seen from the summation point 54 of the current regulator 29, the reference variable of the second drive regulating circuit (current regulator 29, drive 30) is formed by the sum of the output $I_{R\text{-}setpoint}$ of the second speed regulator 36 and of the second force feedforward control value $I_{R\text{-}feedforward}$. The reference variable of the second speed regulator 36 is formed by the output $v_{R\text{-}setpoint}$ of the second position regulator 35. The reference variable of the second position regulator 35, by contrast, is formed by the setpoint position $y_{setpoint}$ exactly like the reference variable of the first position regulator 24. As is evident from the summation point 58 of the second position regulator 35, the signal fed back to the second position regulator 35 is the second position measurement value $y_{R\text{-}actual}$ of the position measuring system (scale 11, scale detection sensor 33) and the signal fed back to the second speed regulator 36 is the time derivative of the second position measurement value $y_{R\text{-}actual}$. In this case, a differentiator 37 is provided for differentiation with respect to time.

Figure 7:
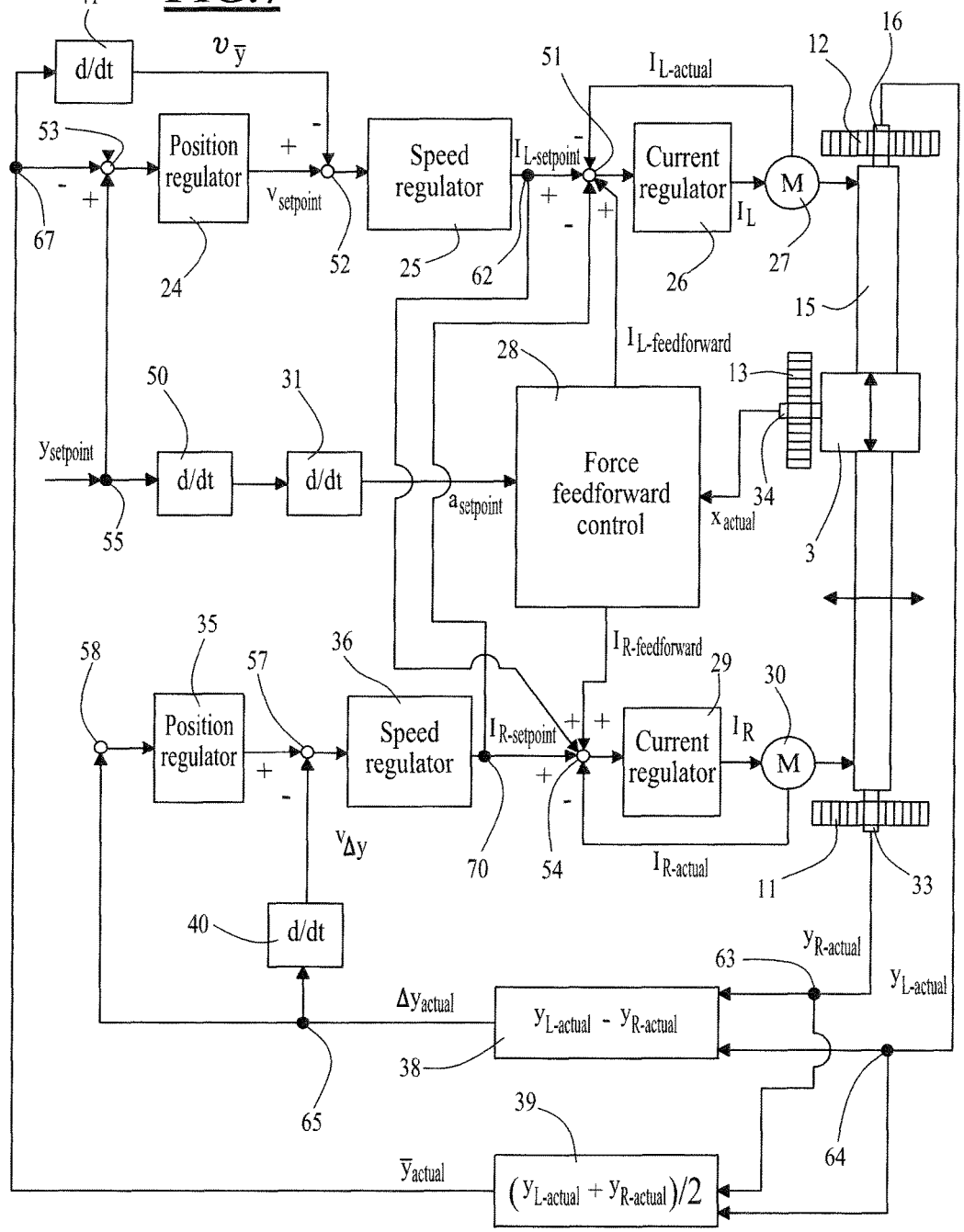
FIG. 7 shows a purely schematic illustration of a further regulating circuit, in which an average value $\bar{y}_{actual}$ of the first position measurement value $y_{L\text{-}actual}$ and of the second position measurement value $y_{R\text{-}actual}$ is fed back to the first position regulator 24 and a time derivative of the average value $\bar{y}_{actual}$ is fed back to the first speed regulator 25 and the difference value $\Delta y_{actual}$ between the first position measurement value $y_{L\text{-}actual}$ and the second position measurement value $y_{R\text{-}actual}$ is fed back to the second position regulator 35 and the time derivative of the difference value $\Delta y_{actual}$ is fed back to the second speed regulator 36.

A fundamental fifth variant of a regulator for actuating the first drive 27 and the second drive 30 can be seen in FIG. 7. This fourth embodiment variant is explained with reference to FIG. 6. In this case, component parts identical to those in FIG. 6 are once again allocated the same reference signs. A first significant difference compared with the regulator in accordance with FIG. 6 can be seen here in the fact that the first position measurement values $y_{L\text{-}actual}$ and the time derivative thereof are not fed back to the first position regulator 24 and the first speed regulator 25. Instead an average value $\bar{y}_{actual}$ formed from the first position measurement value $y_{L\text{-}actual}$ and the second position measurement value $y_{R\text{-}actual}$ is fed back to the first position regulator 24. The average value is ascertained via an average value element 39 according to the following formula:

$$\bar{y}_{actual} = (y_{L\text{-}actual} + y_{R\text{-}actual})/2 \qquad \text{Equation 5:}$$

The time derivative of the average value $\bar{y}_{actual}$ is fed back to the first speed regulator 25, the time derivative being ascertained by the differentiator 41. Moreover, the output $I_{L\text{-}setpoint}$ of the first speed regulator 25 is additionally also applied as part of the reference variable to the summation point 54 of the second current regulator 29 via the branching point 62. The behavior of this first regulating circuit can be understood here such that the position of the first measurement slide 15 here is not regulated along only one movement axis of the first drive 27, but rather along a fictitious drive axis that lies in the center between the two movement axes of the drives 27 and 30. This results from the fact that the respective actual position value is predefined as an average value $\bar{y}_{actual}$ of the two position measurement values $y_{L\text{-}actual}$ and $y_{R\text{-}actual}$ of the two axes. Logically consistently, the output $I_{L\text{-}setpoint}$ of the first speed regulator is present as reference variable both at the first drive regulating circuit (current regulator 26, drive 27) and at the second drive regulating circuit (current regulator 29, drive 30). A further significant difference can also be seen in the second regulating circuit including the second position regulator 35 and the second speed regulator 36. As can be seen therefrom, the reference variable of the second position regulator 35 is equal to zero. By contrast, the difference value $\Delta y_{actual}$ is used as feedback variable for the second position regulator 35, the difference value resulting as the difference value between the first position measurement value $y_{L\text{-}actual}$ and the second position measurement value $y_{R\text{-}actual}$. In this case, the difference value $\Delta y_{actual}$ is ascertained in the difference calculating unit 38 according to the following formula:

$$\Delta y_{actual} = y_{L\text{-}actual} - y_{R\text{-}actual} \qquad \text{Equation 6:}$$

By contrast, the time derivative of the difference signal $\Delta y$ is used as feedback variable to the second speed regulator 36, the time derivative being ascertained by the differentiator 40. The output $I_{R\text{-}setpoint}$ of the second speed regulator 36 is now used not only as part of the reference variable of the current regulator 29 of the second drive regulating circuit (current regulator 29, drive 30) but likewise also as part of the reference variable of the current regulator 26 of the first drive regulating circuit (current regulator 26, drive 27). In this case, what is important to note is that the output $I_{R\text{-}setpoint}$ of the second speed regulator 36 is included as part of the reference variable for the current regulator 29 of the second drive regulating circuit and the current regulator 26 of the first drive regulating circuit with different signs. As is evident from the sign of the summation point 54 of the current regulator 29, the output $I_{R\text{-}setpoint}$ of the second speed regulator 36 with a positive sign as part of the reference variable enters the current regulator 29 of the second drive regulating circuit, while the same output variable arrives at the summation point 51 of the current regulator 26 of the first drive regulating circuit with a negative sign as part of the reference variable of the current regulator 26. As a result it can now be ensured that deviations between the first position measurement value $y_{L\text{-}actual}$ and the second position measurement value $y_{R\text{-}actual}$ are counteracted. This functions by virtue of the quantity zero being predefined as reference variable for the second position regulator 35. This reference variable zero denotes the desired position difference between the first position measurement value $y_{L\text{-}actual}$ and the second position measurement value $y_{R\text{-}actual}$. The position difference $\Delta y_{actual}$ fed back to the second position regulator 35 and also its time derivative fed back to the second speed regulator 36 thereby represent the difference actually prevailing between the first position measurement value $y_{L\text{-}actual}$ and the second position measurement value $y_{R\text{-}actual}$. By applying the output $I_{R\text{-}setpoint}$ as part of the reference variable of the current regulator 29 of the second drive regulating circuit and to the current regulator 26 of the first drive regulating circuit with different signs, what is achieved is that differences between the first position measurement value $y_{L\text{-}actual}$ and the second position measurement value $y_{R\text{-}actual}$ are reduced or completely eliminated. In the case of the regulator in accordance with FIG. 7, therefore, the signal fed back to the first position regulator 24 is the average value $\bar{y}_{actual}$ formed from the first position measurement value $y_{L\text{-}actual}$ and the second position measurement value $y_{R\text{-}actual}$ of the first measurement slide 15 and the signal fed back to the first speed regulator 25 is the time derivative of the average value $\bar{y}_{actual}$. The signal fed back to the second position regulator 35 is the difference value $\Delta y_{actual}$ between the first position measurement value $y_{L\text{-}actual}$ and the second position measurement value $y_{R\text{-}actual}$ of the first measurement slide 15 and the signal fed back to the second speed regulator 36 is the time derivative of the difference value $\Delta y_{actual}$.

Figure 8:
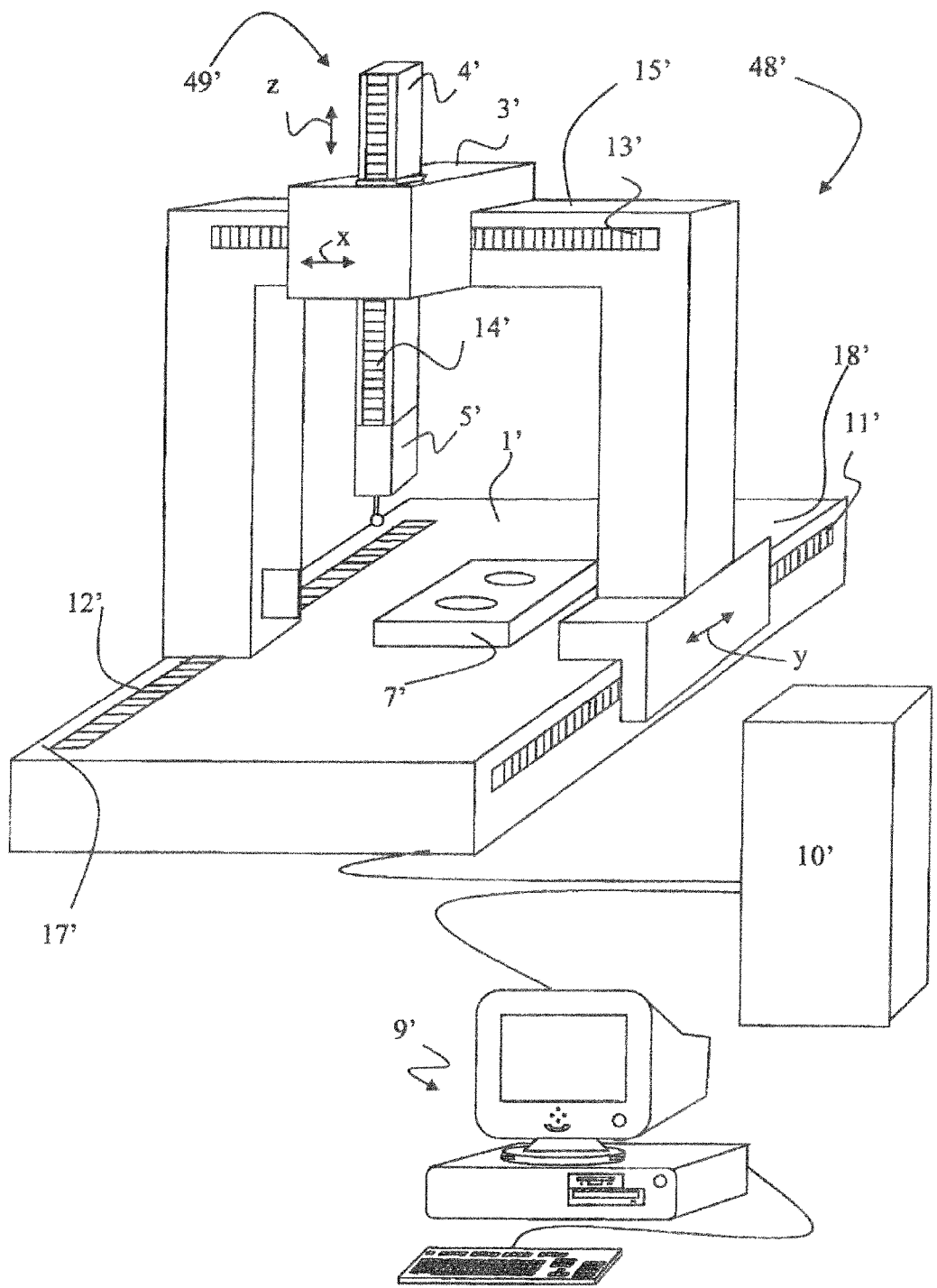
FIG. 8 shows a fundamentally second variant of a coordinate measuring machine 48' according to the invention of gantry configuration; and, FIG. 9 shows a purely schematic illustration of the first measurement slide 15 and of the second measurement slide 3 from FIG. 1 for the elucidation of a torque which as a result of the first drive 27 and the second drive 30 relative to a rotation axis $R_z$, could arise perpendicularly to the first coordinate direction y and the second coordinate direction x.

As already explained above, the regulators shown in FIGS. 2 to 7 can be used not only in a bridge measuring machine, that is shown in FIG. 1, but also for example in a gantry measuring machine, in which the first measurement slide is embodied in the form of a gantry spanning the workpiece support and the first guide and the second guide are arranged in a vertical direction in the region of the workpiece support, as shown in FIG. 8. Such a gantry measuring machine 48' is shown in FIG. 8, wherein the components analogous to the bridge measuring machine 48 in accordance with FIG. 1 have the analogous reference signs and are provided with a prime appended thereto for differentiation. The sole significant difference can be seen here in the configuration of the first measurement slide 15', which here, unlike in FIG. 1, connects the first guide and the second guide to one another not just by a bridge-like beam, but rather here additionally includes two vertically aligned columns which carry the horizontal cross-beam spanning the workpiece support. Accordingly, the first guide 17' and the second guide 18' are also not elevated on props, rather the first guide 17' and the second guide 18' are situated in the vertical direction in the region of the workpiece support 1' and are formed for example by the workpiece support 1' itself. For the rest, the explanations given for the coordinate measuring machine 48 in FIG. 1 are entirely analogously applicable also to the gantry-type coordinate measuring machine 48' shown in FIG. 8.

It is understood that the foregoing description is that of the preferred embodiments of the invention and that various changes and modifications may be made thereto without departing from the spirit and scope of the invention as defined in the appended claims.

LIST OF REFERENCE SIGNS:

| | |
|---|---|
| 1; 1' | workplace support |
| 3; 3' | second measurement slide |
| 4; 4' | third measurement slide |
| 5; 5' | sensor |
| 7; 7' | workpiece |
| 9; 9' | measurement computer |
| 10; 10' | controller |
| 11; 11' | scale |
| 12; 12' | scale |
| 13; 13' | scale |
| 14; 14' | scale |
| 15; 15' | first measurement slide |
| 16 | scale detection sensor |
| 17; 17' | first guide |
| 18; 18' | second guide |
| 19a, 19b | prop |
| 20a, 20b | prop |
| 22 | base |
| 23 | air bearing |
| 24 | first position regulator |
| 25 | first speed regulator |
| 26 | first current regulator |
| 27 | first drive |
| 28 | force feedforward control |
| 29 | second current regulator |
| 30 | second drive |
| 31 | differentiator |
| 32 | differentiator |
| 33 | scale detection sensor |
| 34 | scale detection sensor |
| 35 | second position regulator |
| 36 | second speed regulator |
| 37 | differentiator |
| 38 | difference calculating unit |
| 39 | average value element |
| 40 | differentiator |
| 42 | table |
| 43 | calculating the first proportionality factor |
| 44 | calculating the second proportionality factor |
| 45 | calculating the first force feedforward control value |
| 46 | calculating the second force feedforward control value |
| 48; 48' | coordinate measuring machine |
| 49; 49' | mechanism |
| 50 | differentiator |
| 51-54 | summation point |
| 55 | branching point |
| 56 | first regulating circuit |
| 57-58 | summation point |
| 60-70 | branching point |
| $x_{actual}$ | position measurement value of the second measurement slide 3 |
| $y_{L\text{-}actual}$ | first position measurement value of the first measurement slide 15 |
| $y_{R\text{-}actual}$ | first position measurement value of the first measurement slide 15 |
| $\bar{y}_{actual}$ | average value |
| $\Delta y_{actual}$ | difference value |
| $y_{setpoint}$ | setpoint position |
| $a_{setpoint}$ | setpoint acceleration |
| $C_{L\text{-}actual}$ | first proportionality factor |
| $C_{R\text{-}actual}$ | second proportionality factor |
| $I_{L\text{-}feedforward}$ | first force feedforward control value |
| $I_{R\text{-}feedforward}$ | second force feedforward control value |
| $v_{L\text{-}setpoint}$ | reference variable setpoint speed |
| $v_{R\text{-}setpoint}$ | reference variable setpoint speed |
| $R_z$ | rotation axis |
| SP | center of gravity |
| $F_L$ | generated force of the first drive 27 |
| $F_R$ | generated force of the second drive 30 |
| $a_L$ | lever arm between center of gravity SP and engagement of the force $F_L$ |
| $a_R$ | lever arm between center of gravity SP and engagement of the force $F_R$ |
| $M_L$ | torque geberated by force $F_L$ |
| $M_R$ | torque geberated by force $F_R$ |
| $M_{Res}$ | resultant torque at the center of gravity SP |

What is claimed is:

1. A coordinate measuring apparatus comprising
a workpiece support configured for mounting a workpiece to be measured;
a sensor;
a mechanism configured to move said sensor in at least a first coordinate direction (y) and a second coordinate direction (x) perpendicular to said first coordinate direction;
said mechanism for moving said sensor including
a first guide and a second guide arranged in parallel on opposite sides of said work piece support;
a first measurement slide configured to be guided in said first coordinate direction (y) along said parallel first and second guides;
said first measurement slide spanning said workpiece support;
a first drive configured to drive said first measurement slide along said first guide;
a second drive configured to drive said first measurement slide along said second guide;
a second measurement slide configured to be guided movably in the second coordinate direction (x) along said first measurement slide;
a positioning measuring system assigned to said second measurement slide and configured to determine a position ($x_{actual}$) of said second measurement slide relative to said first measurement slide;
a controller configured to actuate at least said first drive and said second drive; and,
said controller including a force feedforward control, which, depending on said determined position ($x_{actual}$) of said second measurement slide and depending on a setpoint acceleration ($a_{setpoint}$) to be set of said first measurement slide, is configured to cause an actuation of at least one of said first drive and said second drive in such a way that the torques which occur as a result of the acceleration of said first measurement slide by said first drive and by said second drive relative to a rotation axis ($R_z$) which is perpendicular to said first coordinate direction (y) and said second coordinate direction (x) at least partly or completely compensate for one another.

2. The coordinate measuring machine of claim 1, wherein:
said first drive includes a first drive regulating circuit;
said second drive includes a second drive regulating circuit; and,
said force feedforward control is configured to ascertain at least one of a first force feedforward control value ($I_{L-feedforward}$) configured to be applied to said first drive regulating circuit of said first drive and a second force feedforward control value ($I_{R-feedforward}$) configured to be applied to said second drive regulating circuit of said second drive.

3. The coordinate measuring machine of claim 2, wherein at least one of said first force feedforward control value ($I_{L-feedforward}$) and said second force feedforward control value ($I_{R-feedforward}$) is a current value which is applied to a current regulator of the corresponding one of said first drive regulating circuit and said second drive regulating circuit.

4. The coordinate measuring machine of claim 2, wherein said force feedforward control is configured to ascertain at least one of said first force feedforward control value ($I_{L-feedforward}$) from the product of the setpoint acceleration ($a_{setpoint}$) and a first proportionality factor ($C_{L-actual}$) and said second force feedforward control value ($I_{R-feedforward}$) from the product of said setpoint acceleration ($a_{setpoint}$) and a second proportionality factor ($C_{R-actual}$).

5. The coordinate measuring machine of claim 4, wherein:
said first proportionality factor ($C_{L-actual}$) is stored in the form of a first fixed value ($C_{L1}$) assigned to said first proportionality factor ($C_{L-actual}$) for a first position ($x_1$) of said second measurement slide and is stored in the form of a second fixed value ($C_{L2}$) assigned to said first proportionality factor ($C_{L-actual}$) for a second position ($x_2$) of said second measurement slide, wherein said first proportionality factor ($C_{L-actual}$) is ascertained using a present position ($x_{actual}$) of said second measurement slide by linear interpolation or linear extrapolation from the first fixed value ($C_{L1}$) assigned to the first proportionality factor ($C_{L-actual}$) and the second fixed value ($C_{R2}$) assigned to the first proportionality factor ($C_{L-actual}$); and/or,
said second proportionality factor ($C_{R-actual}$) is stored in the form of a first fixed value ($C_{R1}$) assigned to said second proportionality factor ($C_{R-actual}$) for a first position ($x_1$) of said second measurement slide and is stored in the form of a second fixed value ($C_{R2}$) assigned to said second proportionality factor ($C_{R-actual}$) for a second position ($x_2$) of said second measurement slide, wherein said second proportionality factor ($C_{R-actual}$) is ascertained using a present position ($x_{actual}$) of said second measurement slide by linear interpolation or linear extrapolation from said first fixed value ($C_{R1}$) assigned to said second proportionality factor ($C_{R-actual}$) and said second fixed value ($C_{R2}$) assigned to said second proportionality factor ($C_{R-actual}$).

6. The coordinate measuring machine of claim 2 further comprising:
a first regulating circuit including a first position regulator and a first speed regulator;
said first drive regulating circuit is part of said first regulating circuit; wherein,
a reference variable of the first drive regulating circuit is formed by the sum of the output of said first speed regulator and of said first force feedforward control value ($I_{L-feedforward}$) or is formed only by an output of the said first speed regulator;
a reference variable of the first speed regulator is formed by the output of said first position regulator; and,
a reference variable of the first position regulator is formed by a setpoint position ($y_{setpoint}$).

7. The coordinate measuring machine of claim 6, wherein said reference variable of said second drive regulating circuit is formed exclusively by said second force feedforward control value ($I_{R-feedforward}$).

8. The coordinate measuring machine of claim 6, wherein a reference variable of the second drive regulating circuit is formed by a sum of an output ($I_{L-setpoint}$) of said first speed regulator and of said second force feedforward control value ($I_{R-feedforward}$).

9. The coordinate measuring machine of claim 6, wherein said mechanism includes a second position measuring system configured to determine a first position measurement value ($y_{L-actual}$) of said first measurement slide relative to said first guide; and, wherein a signal fed back to said first position regulator is said first position measurement value ($y_{L-actual}$) of the first measurement slide and a signal fed back to the first speed regulator is a time derivative of said first position measurement value ($y_{L-actual}$).

10. The coordinate measuring machine of claim 6, further comprising:
   a second regulating circuit including a second position regulator and a second speed regulator;
   said second drive regulating circuit of the second drive being part of said second regulating circuit;
   wherein, a reference variable of said second drive regulating circuit is formed by a sum of the output ($I_{R\text{-}setpoint}$) of said second speed regulator and of said second force feedforward control value ($I_{R\text{-}feedforward}$); and,
   a reference variable of said second speed regulator is formed by the output ($v_{R\text{-}setpoint}$) of the second position regulator.

11. The coordinate measuring machine of claim 10, wherein:
   said mechanism includes a second position measuring system configured to determine a first position measurement value ($y_{L\text{-}actual}$) of said first measurement slide relative to said first guide, and a third position measuring system configured to determine a second position measurement value ($y_{R\text{-}actual}$) of said first measurement slide relative to said second guide.

12. The coordinate measuring machine of claim 11, wherein the controller is configured as follows:
   a) the signal fed back to the first position regulator is an average value ($\bar{y}_{actual}$) of said first position measurement value ($y_{L\text{-}actual}$) and said second position measurement value ($y_{R\text{-}actual}$) of said first measurement slide, and the signal fed back to said first speed regulator is the time derivative of said average value ($\bar{y}_{actual}$), and the signal fed back to the second position regulator is the difference value ($\Delta y_{actual}$) between said first position measurement value ($y_{L\text{-}actual}$) and said second position measurement value ($y_{R\text{-}actual}$) of said first measurement slide, and the signal fed back to said second speed regulator is the time derivative of said difference value ($\Delta y_{actual}$) or
   b) the signal fed back to the first position regulator is said first position measurement value ($y_{L\text{-}actual}$) of said first measurement slide, and the signal fed back to the first speed regulator is the time derivative of said first position measurement value ($y_{L\text{-}actual}$) and the signal fed back to said second position regulator is said second position measurement value ($y_{R\text{-}actual}$) of said first measurement slide, and the signal fed back to said second speed regulator is the time derivative of said second position measurement value ($y_{R\text{-}actual}$).

13. The coordinate measuring machine of claim 1, wherein the coordinate measuring machine is one of a gantry measuring machine and a bridge measuring machine.

14. The coordinate measuring machine of claim 1, wherein said controller is configured such that the resultant torque as a result of said rotation axis ($R_z$) is less than 10%, in particular less than 5%, of that torque which could be maximally generated by said first drive or said second drive without the respective other drive for a given force.

15. A method for operating a coordinate measuring machine including
   a workpiece support configured for mounting a workpiece;
   a sensor;
   a mechanism for moving said sensor in at least a first coordinate direction (y) and a second coordinate direction (x) perpendicular to said first coordinate direction;
   said mechanism including
      a first guide and a second guide arranged in parallel on opposite sides of said work piece support;
      a first measurement slide configured to be guided in said first coordinate direction (y) along said parallel first and second guides;
      said first measurement slide spanning said workpiece support;
      a first drive configured to drive said first measurement slide along said first guide;
      a second drive configured to drive said first measurement slide along said second guide;
      a second measurement slide configured to be guided movably in the second coordinate direction (x) along said first measurement slide;
      a positioning measuring system assigned to said second measurement slide and configured to determine a position ($x_{actual}$) of said second measurement slide relative to said first measurement slide;
   a controller configured to actuate at least said first drive and said second drive; and,
   said controller including a force feedforward control;
   the method comprising the steps of:
   actuating via said force feedforward control at least one of said first drive and said second drive in dependence upon the determined position ($x_{actual}$) of said second measurement slide and in dependence upon a setpoint acceleration ($a_{setpoint}$) to be set of said first measurement slide in such a way that the torques which occur as a result of the acceleration of said first measurement slide by said first drive and by said second drive relative to a rotation axis ($R_z$) which is perpendicular to said first coordinate direction (y) and said second coordinate direction (x) at least partly or completely compensate for one another.

16. The method of claim 15, further comprising the step of:
   determining, in the controller, at least one of a first force feedforward control value ($I_{L\text{-}feedforward}$) configured to be applied to a first drive regulating circuit of said first drive, and a second force feedforward control value ($I_{R\text{-}feedforward}$) configured to be applied to a second drive regulating circuit of said second drive.

17. The method as claimed in claim 16, wherein the first force feedforward control value ($I_{L\text{-}feedforward}$) is a current value which is applied to a current regulator of said first drive regulating circuit and/or the second force feedforward control value ($I_{R\text{-}feedforward}$) is also a current value which is applied to a current regulator of said second drive regulating circuit.

18. The method of claim 16, wherein at least one of the first force feedforward control value ($I_{L\text{-}feedforward}$) is determined from the product of the setpoint acceleration ($a_{setpoint}$) and a first proportionality factor ($C_{L\text{-}actual}$), and the second force feedforward control value ($I_{R\text{-}feedforward}$) is determined from the product of the setpoint acceleration ($a_{setpoint}$) and a second proportionality factor ($C_{R\text{-}actual}$).

19. The method of claim 18 further comprising the steps of:
   storing the first proportionality factor ($C_{L\text{-}actual}$) in the form of a first fixed value ($C_{L1}$) assigned to the first proportionality factor ($C_{L\text{-}actual}$) for a first position ($x_1$) of the second measurement slide;
   storing the first proportionality factor ($C_{L\text{-}actual}$) in the form of a second fixed value ($C_{L2}$) assigned to the first proportionality factor ($C_{L\text{-}actual}$) for a second position ($x_2$) of the second measurement slide;

wherein the first proportionality factor ($C_{L\text{-}actual}$) is ascertained using the present position ($x_{actual}$) of the second measurement slide by linear interpolation or linear extrapolation from the first fixed value ($C_{L1}$) assigned to the first proportionality factor ($C_{L\text{-}actual}$) and the second fixed value ($C_{R2}$) assigned to the first proportionality factor ($C_{L\text{-}actual}$).

20. The method of claim 18 further comprising the steps of:

storing the second proportionality factor ($C_{R\text{-}actual}$) in the form of a first fixed value ($C_{R1}$) assigned to the second proportionality factor ($C_{R\text{-}actual}$) for a first position ($x_1$) of the second measurement slide;

storing the second proportionality factor ($C_{R\text{-}actual}$) in the form of a second fixed value ($C_{R2}$) assigned to the second proportionality factor ($C_{R\text{-}actual}$) for a second position ($x_2$) of the second measurement slide;

wherein the second proportionality factor ($C_{L\text{-}actual}$) is ascertained using the present position ($x_{actual}$) of the second measurement slide by linear interpolation or linear extrapolation from the first fixed value ($C_{R1}$) assigned to the second proportionality factor ($C_{R\text{-}actual}$) and the second fixed value ($C_{R2}$) assigned to the second proportionality factor ($C_{R\text{-}actual}$).

21. The method of claim 19 further comprising the steps of:

storing the second proportionality factor ($C_{R\text{-}actual}$) in the form of a first fixed value ($C_{R1}$) assigned to the second proportionality factor ($C_{R\text{-}actual}$) for a first position ($x_1$) of the second measurement slide;

storing the second proportionality factor ($C_{R\text{-}actual}$) in the form of a second fixed value ($C_{R2}$) assigned to the second proportionality factor ($C_{R\text{-}actual}$) for a second position ($x_2$) of the second measurement slide;

wherein the second proportionality factor ($C_{L\text{-}actual}$) is ascertained using the present position ($x_{actual}$) of the second measurement slide by linear interpolation or linear extrapolation from the first fixed value ($C_{R1}$) assigned to the second proportionality factor ($C_{R\text{-}actual}$) and the second fixed value ($C_{R2}$) assigned to the second proportionality factor ($C_{R\text{-}actual}$).

22. The method of claim 15, wherein the coordinate measuring machine on which the method is performed is configured as claimed in claim 6.

* * * * *

UNITED STATES PATENT AND TRADEMARK OFFICE
CERTIFICATE OF CORRECTION

PATENT NO. : 10,145,664 B2
APPLICATION NO. : 15/295905
DATED : December 4, 2018
INVENTOR(S) : G. Grupp et al.

It is certified that error appears in the above-identified patent and that said Letters Patent is hereby corrected as shown below:

On the Title Page

Under "OTHER PUBLICATIONS", Line 2: delete "PCT/EP20151056146" and substitute -- PCT/EP2015/056146 -- therefor.

In the Specification

In Column 22:
Line 46: delete "$Y_{R\text{-actual}}$ first position measurement value of the first" and substitute -- $Y_{R\text{-actual}}$ second position measurement value of the first -- therefor.

In Column 22:
Line 63: delete "$M_L$ torque geberated by force $F_L$" and substitute -- $M_L$ torque generated by force $F_L$ -- therefor.

In Column 22:
Line 64: delete "$M_R$ torque geberated by force $F_R$" and substitute -- $M_R$ torque generated by force $F_R$ -- therefor.

Signed and Sealed this
Eighteenth Day of June, 2019

Andrei Iancu
*Director of the United States Patent and Trademark Office*